(12) United States Patent
Fujisawa et al.

(10) Patent No.: US 9,380,276 B2
(45) Date of Patent: Jun. 28, 2016

(54) IMAGE PROCESSING APPARATUS AND METHOD, AND PROGRAM

(71) Applicant: Sony Corporation, Tokyo (JP)

(72) Inventors: Ichiro Fujisawa, Kanagawa (JP);
Akihiro Okumura, Kanagawa (JP);
Katsutoshi Ando, Kanagawa (JP);
Takashi Tsuchiya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 156 days.

(21) Appl. No.: 14/220,361

(22) Filed: Mar. 20, 2014

(65) Prior Publication Data
US 2014/0293088 A1    Oct. 2, 2014

(30) Foreign Application Priority Data

Mar. 29, 2013  (JP) ................................. 2013-074761

(51) Int. Cl.
*G06K 9/00* (2006.01)
*H04N 9/04* (2006.01)

(52) U.S. Cl.
CPC ..................................... *H04N 9/045* (2013.01)

(58) Field of Classification Search
CPC .... H04N 9/735; G06T 3/4015; G06T 3/4053; G09G 5/02
See application file for complete search history.

(56) References Cited

U.S. PATENT DOCUMENTS

| | | | | |
|---|---|---|---|---|
| 7,403,235 B2* | 7/2008 | Nakaya | ................ | H04N 7/0125 348/441 |
| 7,869,085 B2* | 1/2011 | Nemoto | ................ | G09G 5/005 358/1.16 |
| 7,880,772 B2* | 2/2011 | Nagano | ................ | H04N 9/045 348/222.1 |
| 2012/0294513 A1* | 11/2012 | Chida | ....................... | G06T 9/00 382/155 |
| 2014/0055634 A1* | 2/2014 | Tokizaki | ............... | H04N 19/50 348/222.1 |
| 2014/0293082 A1* | 10/2014 | Okumura | .............. | G06T 3/4015 348/222.1 |
| 2014/0293083 A1* | 10/2014 | Okumura | .............. | G06T 3/4015 348/222.1 |
| 2014/0293084 A1* | 10/2014 | Okumura | .............. | G06T 3/4053 348/222.1 |
| 2014/0293088 A1* | 10/2014 | Fujisawa | ............... | H04N 9/045 348/223.1 |

OTHER PUBLICATIONS

Zhang, Lei et al., "Color Demosaicking via Directional Linear Minimum Mean Square-Error Estimation", Mar. 29, 2013.

* cited by examiner

*Primary Examiner* — Amir Alavi
(74) *Attorney, Agent, or Firm* — Frommer Lawrence & Haug LLP; William S. Frommer

(57) ABSTRACT

An image processing apparatus includes a class tap selection unit that selects pixel values related to pixels corresponding to a plurality of color components as a class tap, from a first image formed by image signals which are output from a single-plate type pixel portion, a class sorting unit that sorts out target pixels of second images as any one of a plurality of classes on the basis of a feature amount of the class tap, a prediction tap selection unit that selects pixel values related to pixels corresponding to a first color component of the plurality of color components as a prediction tap from the first image, and a product-sum operation unit that uses the pixel values of the first color component of the prediction tap as variables, and operates pixel values of the second images through a product-sum operation using the read coefficient.

9 Claims, 23 Drawing Sheets

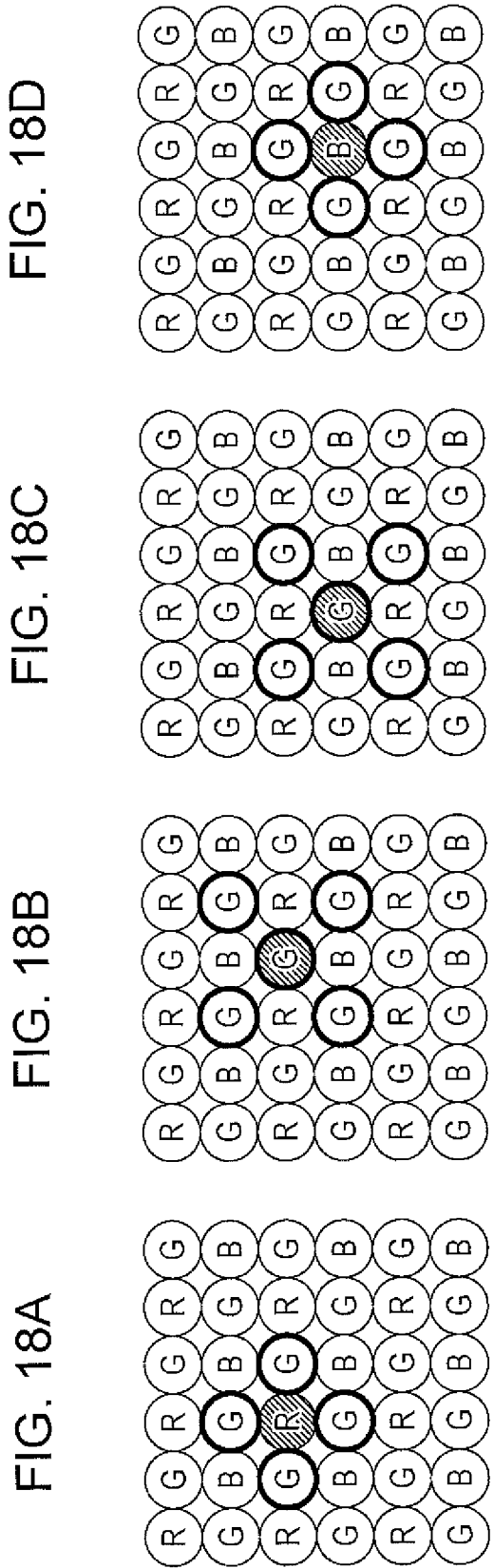

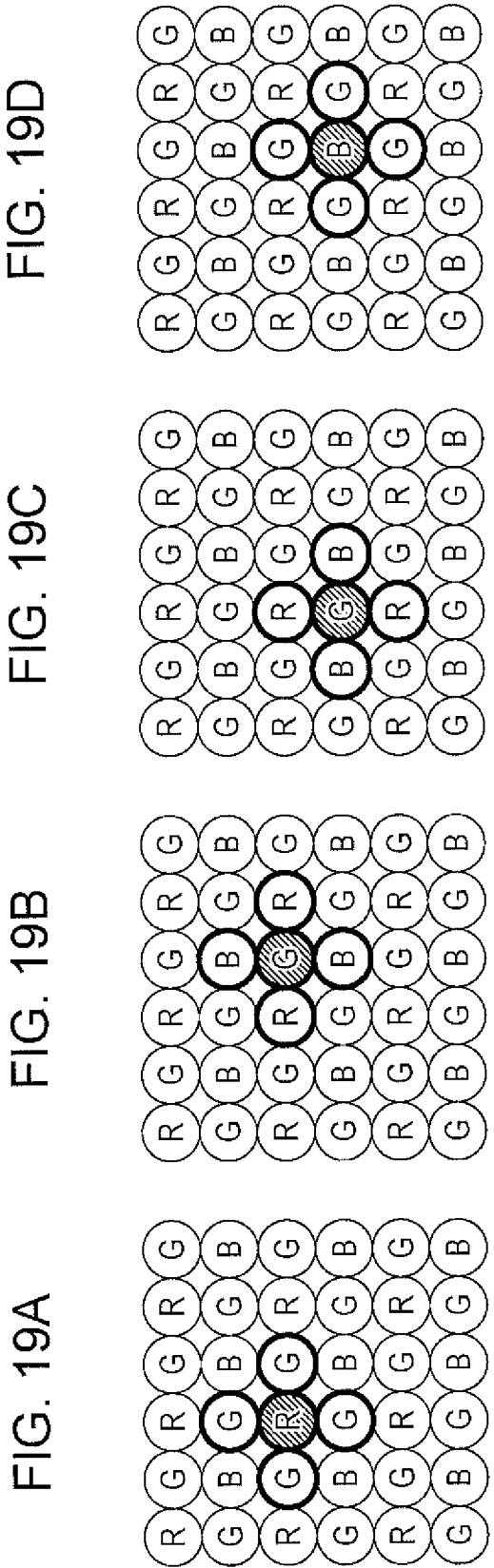

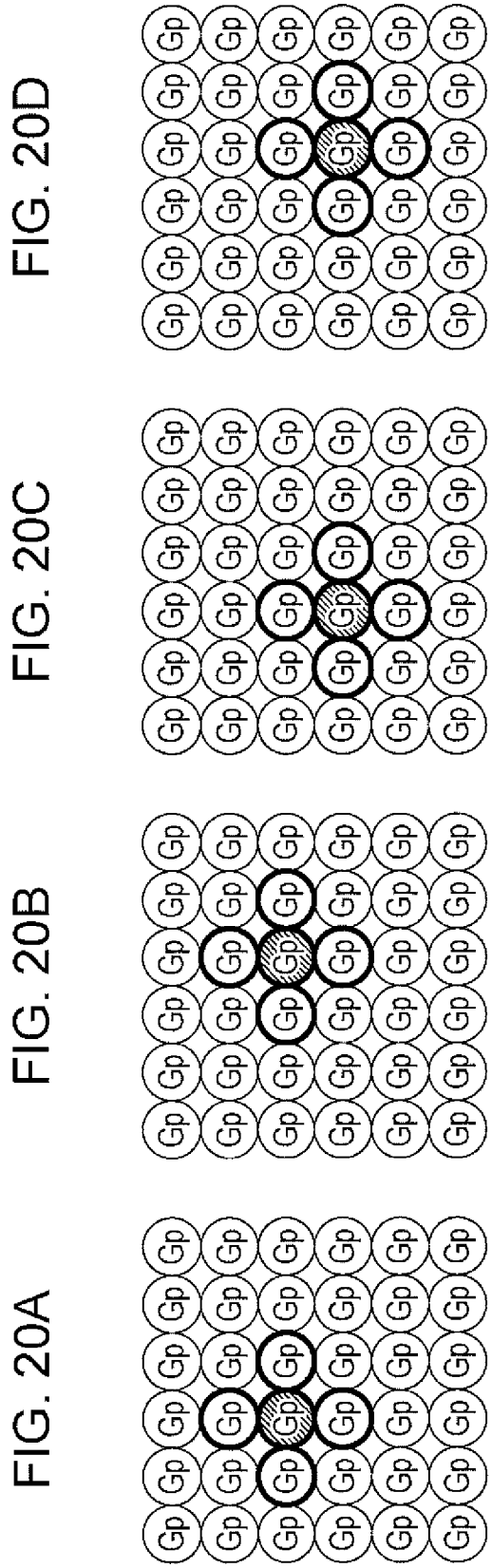

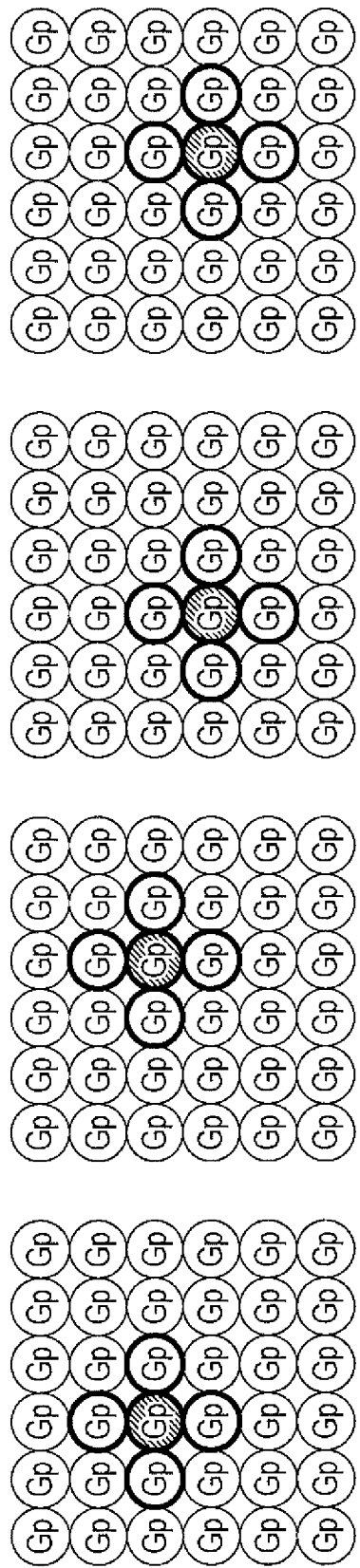

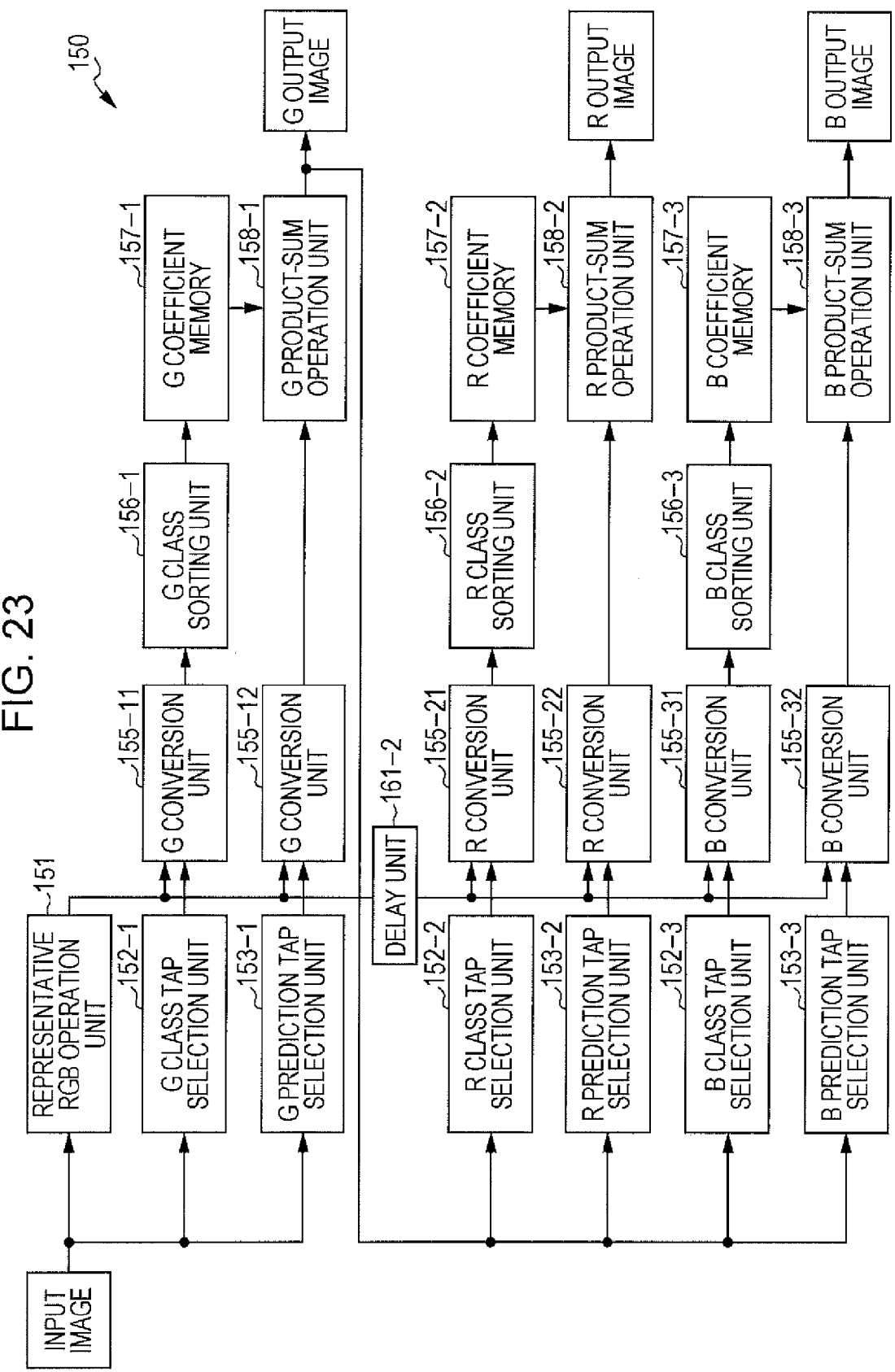

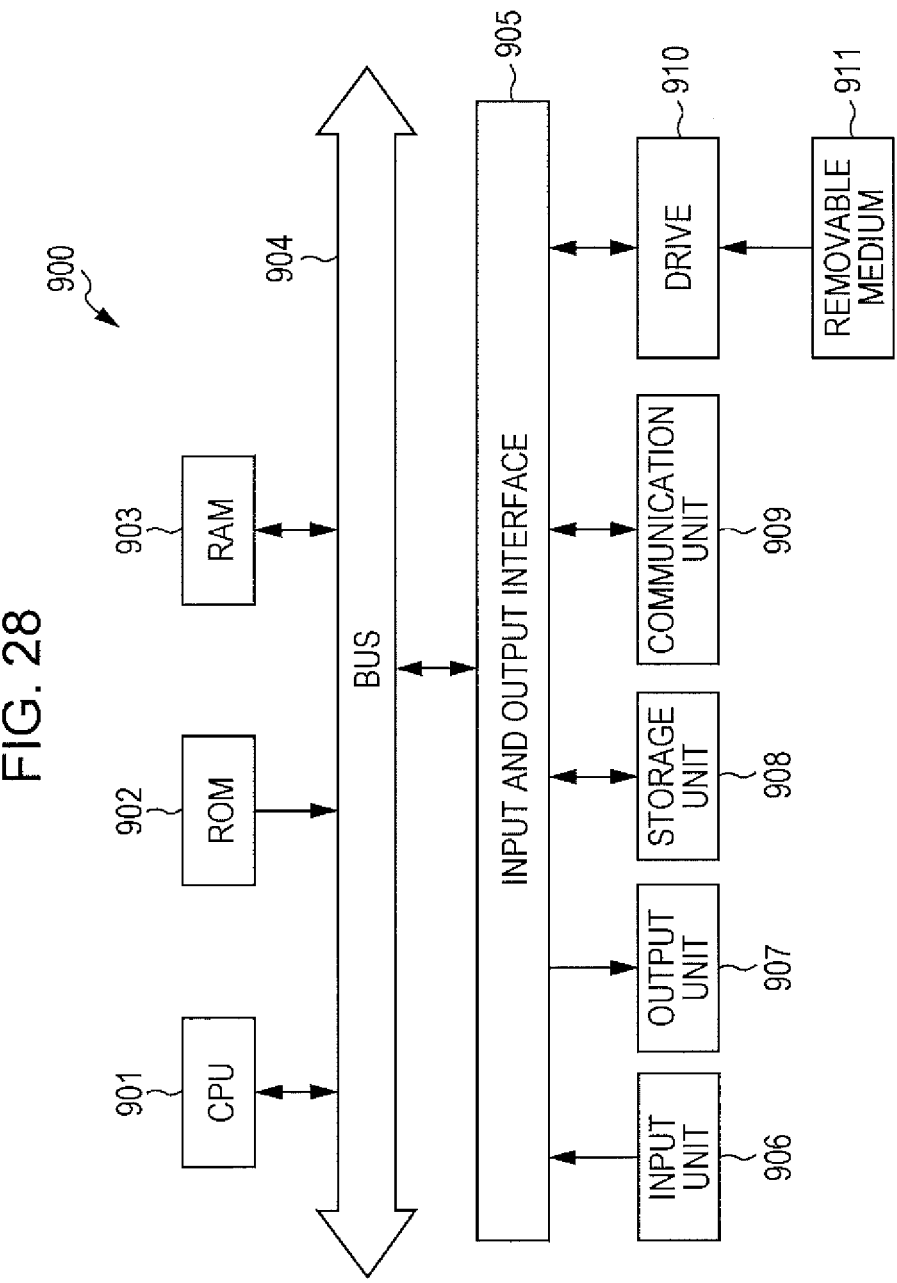

IMAGE PROCESSING APPARATUS AND METHOD, AND PROGRAM

CROSS REFERENCE TO RELATED APPLICATIONS

This application claims the benefit of Japanese Priority Patent Application JP 2013-074761 filed Mar. 29, 2013, the entire contents of which are incorporated herein by reference.

BACKGROUND

The present technology relates to an image processing apparatus and method, and a program, and particularly to an image processing apparatus and method, and a program, capable of reducing zipper noise.

Imaging apparatuses using an image sensor mainly includes a single-plate type apparatus (hereinafter, referred to as a single-plate type camera) using a single image sensor and a three-plate type apparatus camera (hereinafter, referred to as a three-plate type camera) using three image sensors.

In the three-plate type camera, for example, three image sensors for an R signal, a G signal, and a B signal, and three primary color signals are obtained using the three image sensors. In addition, a color image signal generated from the three primary color signals is recorded onto a recording medium.

In the single-plate type camera, a single image sensor is used in which a color coding filter formed by an array of a color filter assigned to each pixel is provided on a front surface, and a color component signal which is color-coded by the color coding filter is obtained for each pixel. As a color filter array forming the color coding filter, primary color filter arrays of red (R), green (G), and blue (B), or complementary color filter arrays of yellow (Ye), cyanogen (Cy), and magenta (Mg) are used. In addition, in the single-plate type camera, a single color component signal is obtained for each pixel using the image sensor, and color signals other than a color component signal of each pixel are generated through a linear interpolation process, thereby obtaining an image close to an image obtained by the three-plate type camera. In a video camera and the like, the single-plate type is employed in order to achieve miniaturization and light weight.

A color filter array with the Bayer array is frequently used as a color filter array forming the color coding filter. In the Bayer array, G filters are disposed in a checkered pattern, and R and B filters are alternately disposed for each column in the remaining parts.

In this case, the image sensor outputs only an image signal corresponding to a color of a filter, from each pixel where one color filter of three primary colors of R, G and B is disposed. In other words, an R component image signal is output from a pixel in which the R filter is disposed, but G component and B component image signals are not output therefrom. Similarly, only a G component image signal is output from a G pixel, and R component and B component image signals are not output therefrom. Only a B component image signal is output from a B pixel, and R component and B component image signals are not output therefrom.

However, when the signal of each pixel is processed in a subsequent stage of an image process, R component, G component, and B component image signals are necessary for every pixel. Therefore, in the related art, n×m image signals of the R pixels, n×m (where n and m are positive integers) image signals of the G pixels, and n×m image signals of the B pixels are obtained from an output of the image sensor formed by n×m pixels through interpolation operations, respectively, and are output to the subsequent stage.

A DLMMSE method is known for the related art (refer to DLMMSE algorithm from L. Zhang and X. Wu, "Color demosaicking via directional linear minimum mean square-error estimation," IEEE Trans. on Image Processing, vol. 14, no. 12, pp. 2167 to 2178, 2005.)

In the DLMMSE method, first, with respect to an input image from an image sensor, a G component pixel signal is interpolated, and B component and R component pixel signals are interpolated using color differences (B-G and R-G) after the G component is interpolated. In addition, when the G component is interpolated, an interpolation value which produces a minimum square error in each of the vertical direction and horizontal direction of the input image is generated. Further, directionality in the vertical direction and horizontal direction is detected, and an interpolation value in the vertical direction and an interpolation value in the horizontal direction are apportioned on the basis of a detection result.

SUMMARY

However, in a case of using the DLMMSE method, a phenomenon that an averaged color difference is smaller than an original color difference occurs in a pattern in which only an R component is present locally. This phenomenon is a so-called decoloring phenomenon, and the color difference is reduced, and, as a result, a G component level increases.

Specifically, as illustrated in FIG. 1, by using the DLMMSE method, in an input image (FIG. 2) from an image sensor, upon comparison between a color difference calculated using three points including both of right and left G pixels which is adjacent to an R pixel set as a central pixel and a color difference calculated using five points including both of the adjacent right and left G pixels and R pixels, a level of the color difference calculated using the five points is lower than a level of the color difference calculated using the three points. In other words, in the pattern in which only the R component is present, if a level of the R pixel as a central pixel is lower than an average level of both of the adjacent right and left R pixels, a level of the color difference (R-G) of the central R pixel is reduced. As a result, since the R component is calculated in a fixed manner, a G component level of the central R pixel increases.

As above, the G component level of only one point increases, and thus a white point or a black point is separately generated. Such noise is called zipper noise. In other words, as in the DLMMSE method, in a method of increasing a sense of resolution by averaging a color difference in a certain direction, there is a probability that the zipper noise may occur at a location where a color difference variation is present locally. In addition, FIG. 3 illustrates an image obtained through three-point calculation. FIG. 4 illustrates an image obtained through five-point calculation, and the zipper noise occurs in the image obtained through the five-point calculation.

It is desirable to reduce the occurrence of zipper noise even at a location where there is a local color difference variation in an input image from an image sensor.

According to an embodiment of the present technology, there is provided an image processing apparatus including a class tap selection unit that selects pixel values related to pixels corresponding to a plurality of color components as a class tap, from a first image formed by image signals which are output from a single-plate type pixel portion where the pixels respectively corresponding to the plurality of color components are regularly disposed on a plane; a class sorting unit that sorts out target pixels of second images as any one of a plurality of classes on the basis of a feature amount obtained from the pixel values of the plurality of color components of the class tap, each of the second images being formed by pixels of only a single color component of the plurality of color components; a coefficient reading unit that reads a coefficient stored in advance on the basis of a result of the class sorting; a prediction tap selection unit that selects pixel values related to pixels corresponding to a first color component of the plurality of color components as a prediction tap from the first image; and a product-sum operation unit that uses the pixel values of the first color component of the prediction tap as variables, and operates pixel values of the second images through a product-sum operation using the read coefficient, in which the second image formed by only the first color component is generated from an image formed by the plurality of color components, and in which, when the second image formed by only a second color component different from the first color component is generated from the image formed by the plurality of color components, the prediction tap is acquired from the second image formed by only the first color component.

The image processing apparatus may further include a representative value operation unit that selects a designated region including a predetermined number of pixels from the first image, and operates representative values for the respective color components in the designated region; and a first color component conversion unit that converts the pixel values of the first color component of the prediction tap into first conversion values which are obtained by offsetting the pixel values of the first color component with respect to a pixel value of one of the plurality of color components serving as a reference by using the representative value. Here, the product-sum operation unit may use the first conversion values as variables, and operate pixel values of the second image through a product-sum operation using the read coefficient.

The image processing apparatus may further include a second color component conversion unit that converts the pixel values of the plurality of color components of the class tap into second conversion values which are obtained by offsetting the pixel values of the plurality of color components with respect to a pixel value of one of the plurality of color components serving as a reference by using the representative value. Here, the class sorting unit may determine a feature amount of the class tap on the basis of the second conversion values.

In the image processing apparatus, the single-plate type pixel portion may be a pixel portion with a Bayer array including R, G and B components. In addition, the representative value operation unit may calculate an interpolation value g of an R pixel or a B pixel on the basis of a G pixel around the R pixel or the B pixel; calculate an interpolation value r and an interpolation value b of the G pixel on the basis of the R pixel or the B pixel around the G pixel; operate a G representative value by using an average value of an input value G which is directly obtained from the G pixel and the interpolation value g; operate an R representative value on the basis of a difference between the interpolation value r and the input value G, a difference between an input value R which is directly obtained from the R pixel and the interpolation value g, and the G representative value; and operate a B representative value on the basis of a difference between the interpolation value b and the input value G, a difference between an input value B which is directly obtained from the B pixel and the interpolation value g, and the G representative value.

In the image processing apparatus, when the second image is formed by only the G pixel, the color component conversion unit may offset the input value R by a difference between the R representative value and the G representative value, and offsets the input value B by a difference between the B representative value and the G representative value. When the second image is formed by only the R pixel, the color component conversion unit may offset the input value G by a difference between the G representative value and the R representative value, and offsets the input value B by a difference between the B representative value and the R representative value. In addition, when the second image is formed by only the B pixel, the color component conversion unit may offset the input value G by a difference between the G representative value and the B representative value, and offsets the input value R by a difference between the R representative value and the B representative value.

The image processing apparatus may further include a color variation detection unit that detects a color component variation from the first image, and the class sorting unit may perform class sorting on the basis of a detection result by the color variation detection unit.

In the image processing apparatus, the coefficient read by the coefficient reading unit may be obtained in advance through learning. In the learning, images, which are formed by image signals output from a plurality of pixel portions each of which includes pixels of only a single color component of the plurality of color components, may be used as teacher images, the pixel portions being disposed at a position closer to a subject than an optical low-pass filter disposed between the single-plate type pixel portion and the subject; an image formed by the image signals output from the single-plate type pixel portion may be used as a student image; and the coefficient may be calculated by solving a normal equation which maps the pixel of the student image and the pixel of the teacher image to each other.

An image processing method or a program according to another embodiment of the present technology is an image processing method or a program corresponding to the image processing apparatus according to the embodiment of the present technology.

According to the image processing apparatus and method and the program of the embodiments of the present technology, pixel values related to pixels corresponding to a plurality of color components are selected as a class tap from a first image formed by image signals which are output from a single-plate type pixel portion where the pixels respectively corresponding to the plurality of color components are regularly disposed on a plane; target pixels of second images are sorted out as any one of a plurality of classes on the basis of a feature amount obtained from the pixel values of the plurality of color components of the class tap, each of the second images being formed by pixels of only a single color component of the plurality of color components; a coefficient stored in advance is read on the basis of a result of the class sorting; pixel values related to pixels corresponding to a first color component of the plurality of color components are selected as a prediction tap from the first image; the pixel values of the first color component of the prediction tap are used as variables, and pixel values of the second image are operated through a product-sum operation using the read coefficient; the second image formed by only the first color component is generated from an image formed by the plurality of color components; and the prediction tap is acquired from the second image formed by only the first color component when the second image formed by only a second color component different from the first color component is generated from the image formed by the plurality of color components.

According to the embodiment of the present technology, it is possible to reduce zipper noise.

BRIEF DESCRIPTION OF THE DRAWINGS

FIGS. 18A to 18D are diagrams illustrating examples of a structure of a G prediction tap acquired in the image processing apparatus of FIG. 16;

FIGS. 19A to 19D are diagrams illustrating examples of a structure of a R class tap acquired in the image processing apparatus of FIG. 16;

FIGS. 20A to 20D are diagrams illustrating examples of a structure of a R prediction tap acquired in the image processing apparatus of FIG. 16;

FIGS. 22A to 22D are diagrams illustrating examples of a structure of a B prediction tap acquired in the image processing apparatus of FIG. 16;

FIG. 23 is a block diagram illustrating another configuration example of the image processing apparatus of FIG. 16;

FIG. 28 is a block diagram illustrating a configuration example of a computer.

DETAILED DESCRIPTION OF EMBODIMENTS

Hereinafter, embodiments of the present technology will be described with reference to the drawings.

Image Signal Acquisition Method

Figure 1:
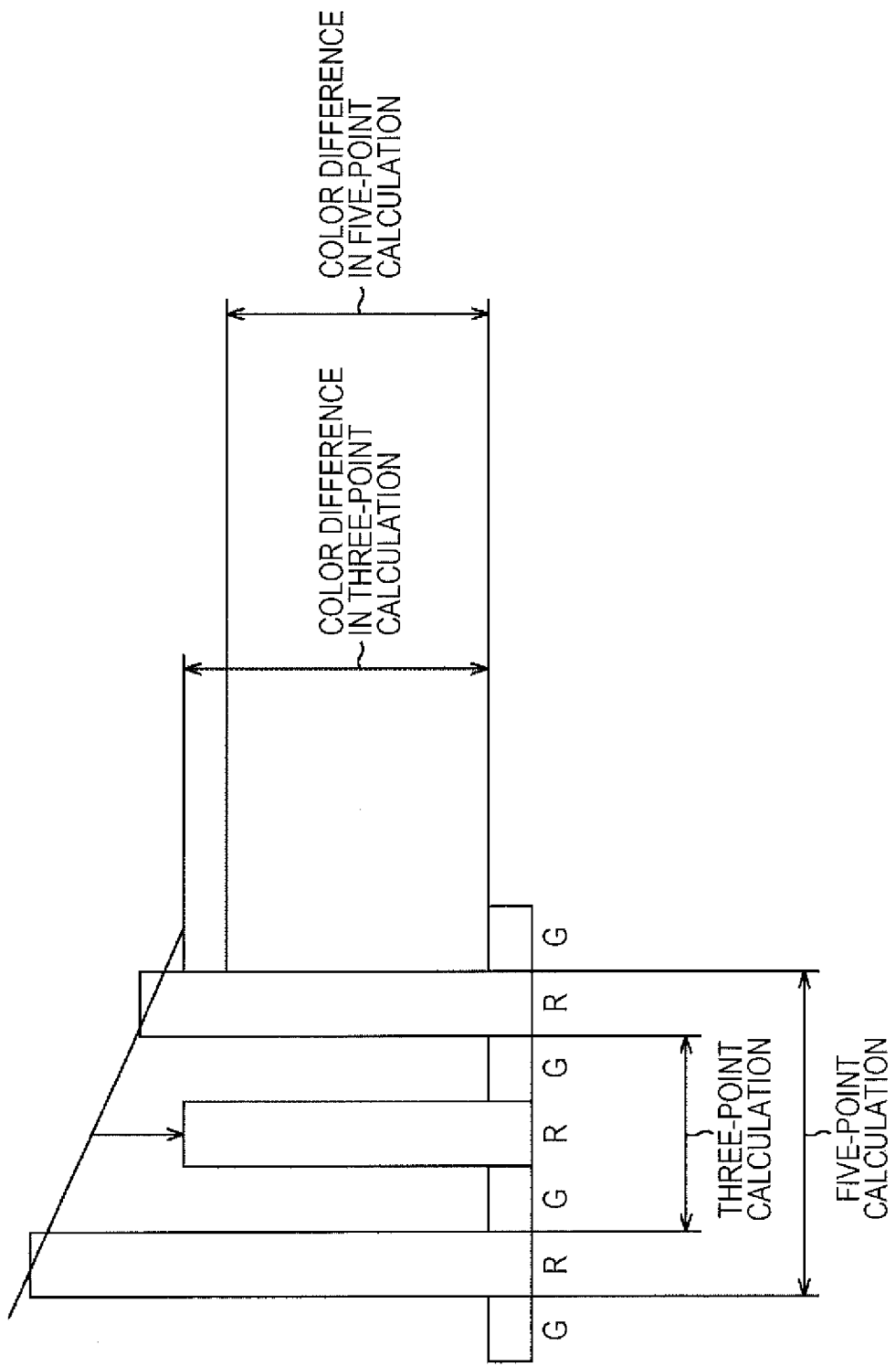
FIG. 1 is a diagram illustrating a principle of zipper noise.
Figure 2:
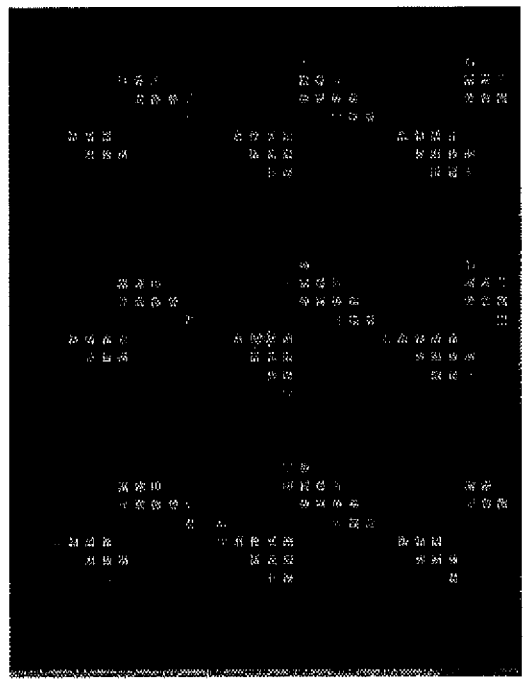
FIG. 2 is a diagram illustrating an input image.
Figure 3:
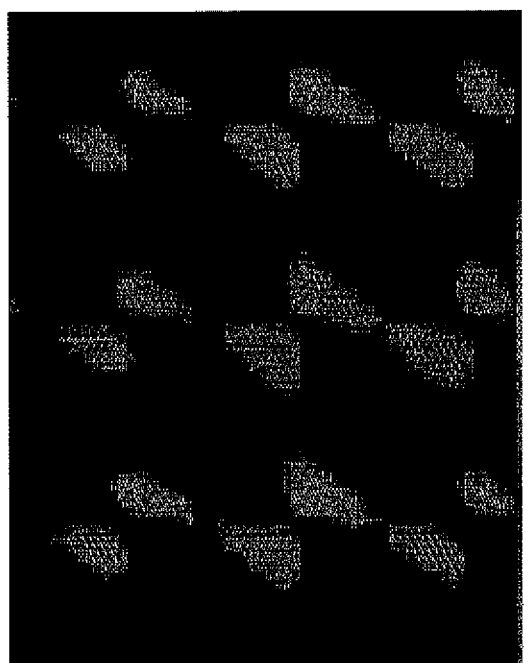
FIG. 3 is a diagram illustrating an image obtained using a DLMMSE method (three-point calculation)
Figure 4:
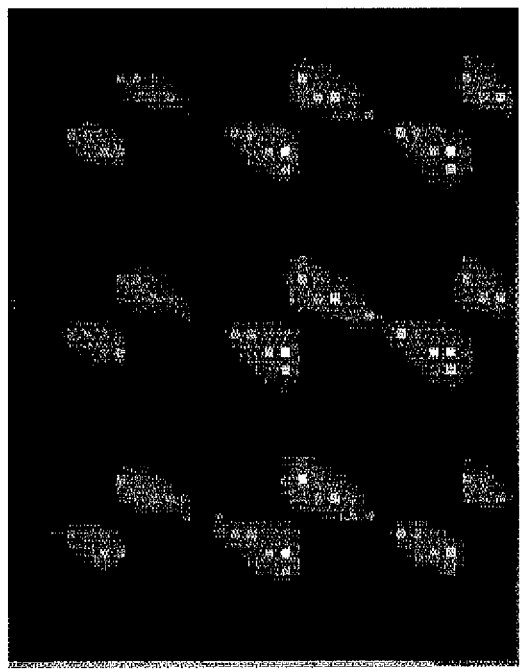
FIG. 4 is a diagram illustrating an image obtained using a DLMMSE method (five-point calculation)
Figure 5:
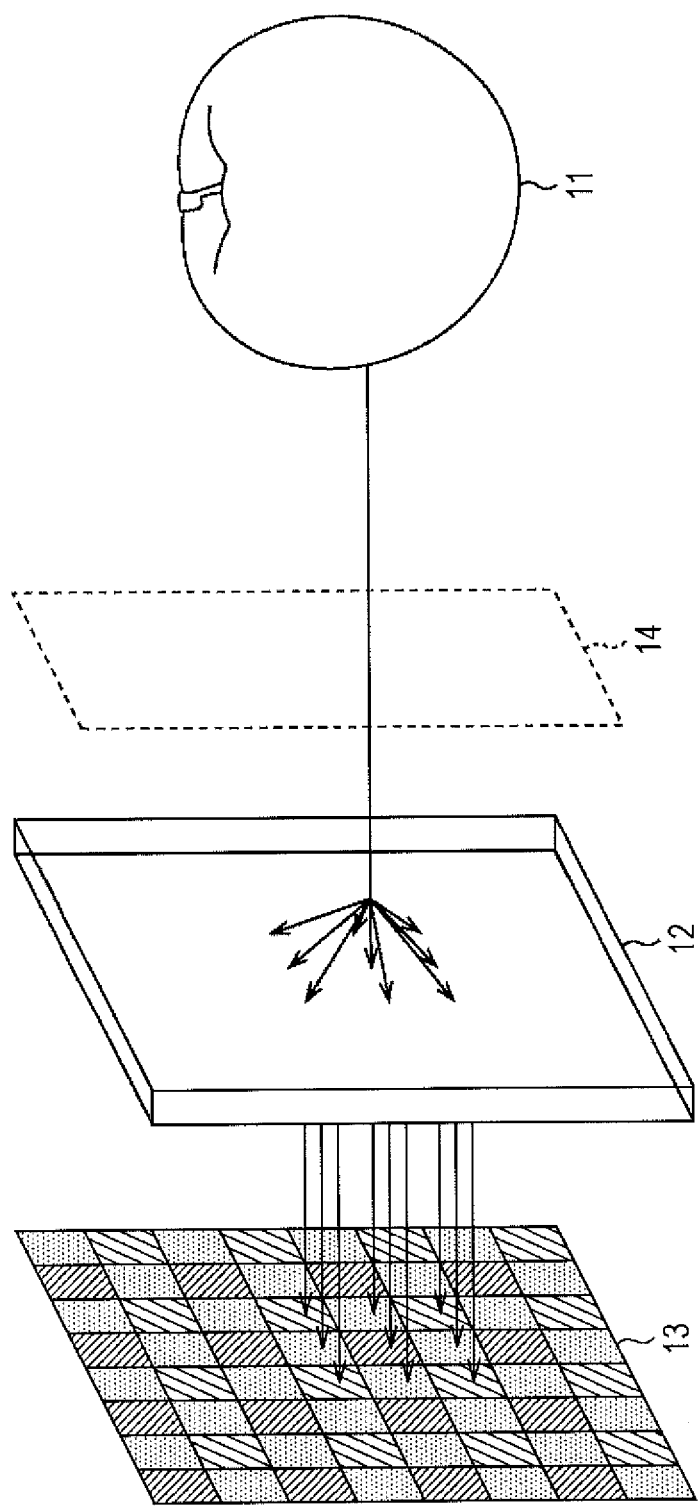
FIG. 5 is a diagram illustrating an image signal acquisition method in an image sensor of a single-plate type camera.

FIG. 5 is a diagram illustrating an image signal acquisition method in an image sensor of a single-plate type camera.

In this example, light reflected by a subject 11 passes through an optical low-pass filter 12 and is received by an image sensor 13.

In the single-plate type camera, a single image sensor is used in which a color coding filter formed by an array of a color filter assigned to each pixel is provided on a front surface, and a color component signal which is color-coded by the color coding filter is obtained for each pixel.

Here, a color filter array with the Bayer array is used in the image sensor 13, and G filters are disposed in a checkered pattern, and R and B filters are alternately disposed for each column in the remaining parts. In other words, four pixels in the rectangular region in the image sensor 13 include two G pixels, a single R pixel, and a single B pixel.

In the single-plate type camera, when the signal of each pixel is processed in a subsequent stage of an image process, R component, G component, and B component image signals are necessary for each pixel. For this reason, it is necessary to obtain R component, G component, and B component pixel values every pixel through an interpolation operation or the like, on the basis of pixel values output from the image sensor 13.

In addition, in the image sensor 13, the light incident to the image sensor is made to pass through the optical low-pass filter 12 in order to prevent an influence of a false color, artifact, or the like. However, if the light is made to pass through the optical low-pass filter 12 as above, an image may be blurred.

Therefore, in the present technology, on the basis of pixel values output from the image sensor 13, pixel values can be obtained which are obtained assuming that three image sensors respectively corresponding to an R component, a G component, and a B component are disposed in a frame (the dotted rectangle in FIG. 5) 14.

1. First Embodiment

Configuration of Image Processing Apparatus

Figure 6:
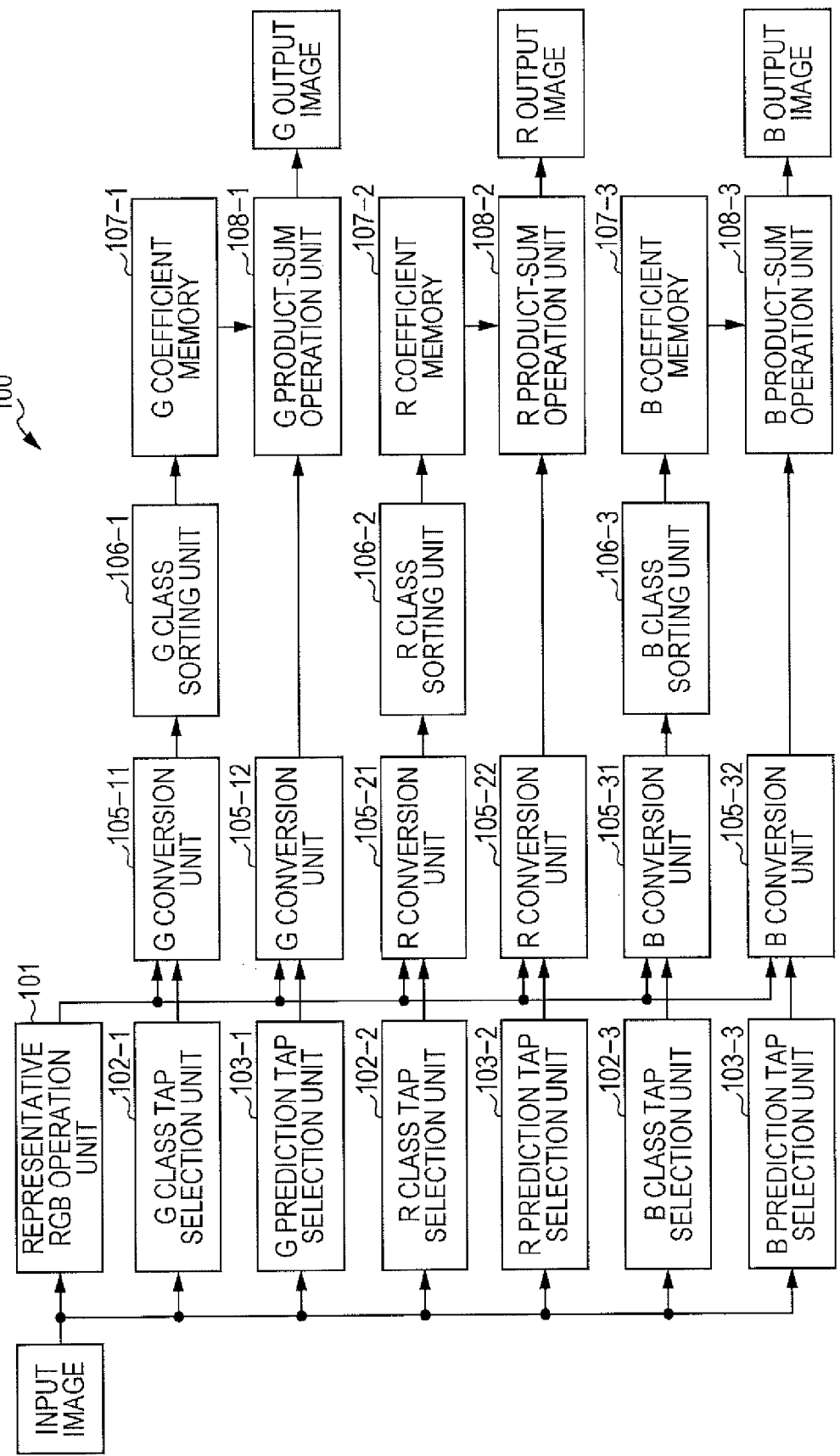
FIG. 6 is a block diagram illustrating a configuration example according to an embodiment of an image processing apparatus to which the present technology is applied.

FIG. 6 is a block diagram illustrating a configuration example according to an embodiment of an image processing apparatus to which the present technology is applied. An image processing apparatus 100 uses values of a pixel corresponding to a target pixel and peripheral pixels thereof in an input image as variables, and predicts a pixel value of the target pixel of an output image through a product-sum operation using a coefficient which is obtained in advance through learning.

The input image which is input to the image processing apparatus 100 is an image formed using output values of an image sensor which uses, for example, a color filter array with the Bayer array. In other words, the input image is an image corresponding to signals output from, for example, the image sensor 13 of FIG. 5. Therefore, in the input image, an R component image signal is obtained from a pixel in which an R filter is disposed, but G component and B component image signals are not be obtained therefrom. Similarly, only a G component image signal is obtained from a G pixel, and R component and B component image signals are not obtained therefrom. Only a B component image signal is obtained from a B pixel, and R component and G component image signals are not obtained therefrom.

The image processing apparatus 100 of FIG. 6 includes a representative RGB operation unit 101, and class tap selection units respectively corresponding to R, G and B, prediction tap selection units respectively corresponding to R, G and B, color conversion units respectively corresponding to R, G and B, class sorting units respectively corresponding to R, G and B, coefficient memories respectively corresponding to R, G and B, and product-sum operation units respectively corresponding to R, G and B.

The representative RGB operation unit 101 operates Dr, Db, and Dg, as representative values serving as a reference of a pixel value of each color component of R, G and B in a region (hereinafter, referred to as a designated region) in an image, for acquiring a class tap or a prediction tap described later.

Figure 7:
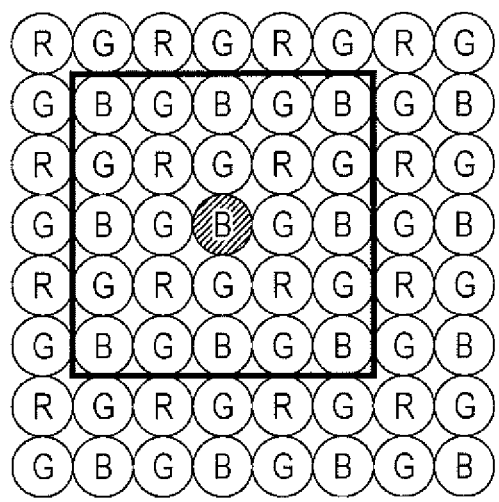
FIG. 7 is a diagram illustrating an example of a designated region.

For example, it is assumed that the designated region is set as illustrated in a solid frame of FIG. 7. In FIG. 7, each of the circles indicates a pixel of the input image, and a pixel indicated by the hatched circle in the center is regarded as a central pixel of a class tap or a prediction tap. In addition, the letters R, G and B in the respective circles indicate color components of respective pixels.

The designated region may be arbitrarily set to a region including a class tap or a prediction tap centering on the central pixel, but if a region which considerably exceeds a class tap or a prediction tap is set, it may be difficult to perform an optimal process corresponding to an image region. For this reason, the designated region is preferably the same region as a class tap or a prediction tap.

In addition, in the following description, an average value, an interpolation value, a representative value, and the like calculated through operations are appropriately referred to, but respective pixel values of an input image before the operations are performed are referred to as an input value G, an input value R, and an input value B for differentiation from each other, in accordance with color components of the respective pixels. In other words, a pixel value which is directly obtained from a pixel where an R filter of an image sensor with the Bayer array is disposed is set to an input value R; a pixel value which is directly obtained from a pixel where a G filter of the image sensor with the Bayer array is disposed is set to an input value G; and a pixel value which is directly obtained from a pixel where a B filter of the image sensor with the Bayer array is disposed is set to an input value B.

In this example, a region which is surrounded by the solid line in FIG. 7 and includes 25(=5×5) pixels centering on the central pixel is set as the designated region.

The representative RGB operation unit 101 first calculates a G component representative value Dg.

Figure 8:
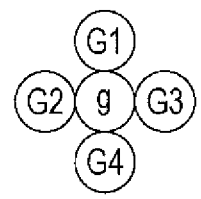
FIG. 8 is a diagram illustrating an example of a calculation method of an interpolation value g.

At this time, the representative RGB operation unit 101, as illustrated in FIG. 8, uses the R component pixel or the B component pixel in the designated region as a central pixel, and averages an input value G1 to an input value G4 of the pixel G1 to the pixel G4 which are four peripheral pixels (top and bottom and right and left) of the central pixel, thereby calculating an interpolation value g which is a value of the G component interpolated at the pixel position of the central pixel. Accordingly, the R component pixel and the B component pixel which do not have the G component in the input image have the interpolated G component (interpolation value g).

In addition, the representative RGB operation unit 101 calculates an average value of input values G of all the G pixels (twelve in this example) in the designated region and the interpolation value g as a representative value Dg.

Figure 9:
FIG. 9 is a diagram illustrating an example of a calculation method of an interpolation value r.

Next, the representative RGB operation unit 101 calculates an R component representative value Dr. At this time, the representative RGB operation unit 101 calculates an interpolation value r which is a value of the R component interpolated at each pixel position of the G pixels in the designated region. For example, in a case of calculating the interpolation value r at the position of the pixel G1 or the pixel G4 of FIG. 8, as illustrated in FIG. 9, an average value of the pixel R2 and the pixel R1 which are adjacent to the G pixel on both of right and left sides is regarded as the interpolation value r.

Accordingly, the input value G and the interpolation value r can be obtained at the pixel position of the G pixel in the designated region, and an input value R and an interpolation value g can be obtained at the pixel position of the R pixel in the designated region.

In addition, (interpolation value r—input value G) and (input value R—interpolation value g) are calculated at each pixel position, and a value obtained by adding the representative value Dg to an average value of the calculated (interpolation value r—input value G) and (input value R—interpolation value g) is calculated as a representative value Dr.

Figure 10:
FIG. 10 is a diagram illustrating an example of a calculation method of an interpolation value b.

Next, the representative RGB operation unit 101 calculates a B component representative value Db. At this time, the representative RGB operation unit 101 calculates an interpolation value b which is a value of the B component interpolated at each pixel position of the G pixels in the designated region. For example, in a case of calculating the interpolation value b at the position of the pixel G1 or the pixel G4 of FIG. 8, as illustrated in FIG. 10, an average value of the pixel B1 and the pixel B2 which are adjacent to the G pixel on both of top and bottom sides is regarded as the interpolation value b.

Accordingly, the input value G and the interpolation value b can be obtained at the pixel position of the G pixel in the designated region, and an input value B and an interpolation value g can be obtained at the pixel position of the B pixel in the designated region.

In addition, (interpolation value b—input value G) and (input value B—interpolation value g) are calculated at each pixel position, and a value obtained by adding the representative value Dg to an average value of the calculated (interpolation value b—input value G) and (input value B—interpolation value g) is calculated as a representative value Db.

Referring to FIG. 6 again, the G class tap selection unit 102-1 selects and acquires a G class tap which is a class tap necessary in generating a G component image, from the input image. The G class tap is formed by, for example, a predetermined number of pixels centering on a central pixel, and the central pixel is a pixel of the input image at a position corresponding to a target pixel of an output image.

The G class tap selected by the G class tap selection unit 102-1 is supplied to the G conversion unit 105-11. The G conversion unit 105-11 performs a G conversion process on each pixel value forming the G class tap.

The G conversion process is performed as follows, for example. In a case where a pixel value forming the G class tap is the input value G, a conversion value G' is operated; in a case where a pixel value forming the G class tap is the input value R, a conversion value R' is operated; and in a case where a pixel value forming the G class tap is the input value B, a conversion value B' is operated.

Here, the conversion value G', the conversion value R', and the conversion value B' are respectively operated using Equations (1) to (3).

$$G' = G \tag{1}$$

$$R' = R - (Dr - Dg) \tag{2}$$

$$B' = B - (Db - Dg) \tag{3}$$

It is possible to increase the correlation of each pixel value forming the G class tap by performing the G conversion process. In other words, each pixel value of the R pixel and the B pixel of the input image is offset with respect to the pixel value of the G pixel serving as a reference, and thus it is possible to remove a variation due to a color component difference of each pixel value forming the G class tap.

Referring to FIG. 6 again, the G class tap output from the G conversion unit 105-11 is supplied to the G class sorting unit 106-1. In addition, the G class tap output from the G conversion unit 105-11 includes the conversion value G', the conversion value R', and the conversion value B' which have been operated using the above Equations (1) to (3).

The G class sorting unit 106-1 codes the supplied G class tap by using adaptive dynamic range coding (ADRC) so as to generate a class code. The class code generated here is output to the G coefficient memory 107-1.

The G coefficient memory 107-1 reads a coefficient which is stored in correlation with the class code output from the G class sorting unit 106-1, and supplies the read coefficient to the G product-sum operation unit 108-1. In addition, the G coefficient memory 107-1 stores a coefficient which is obtained in advance through learning and is used in a product-sum operation described later, in correlation with the class code.

The G prediction tap selection unit 103-1 selects and acquires a G prediction tap which is a prediction tap necessary in generating a G component image from the input image. The G prediction tap is formed by, for example, a predetermined number of pixels centering on a central pixel, and the central pixel is a pixel of the input image at a position corresponding to a target pixel of an output image.

The G prediction tap selected by the G prediction tap selection unit 103-1 is supplied to the G conversion unit 105-12. The G conversion unit 105-12 performs a G conversion process on each pixel value forming the G prediction tap.

The G conversion process performed by the G conversion unit 105-12 is the same as the one performed by the G conversion unit 105-11. In other words, by using the above Equations (1) to (3), in a case where a pixel value forming the G prediction tap is the input value G, a conversion value G' is operated; in a case where a pixel value forming the G prediction tap is the input value R, a conversion value R' is operated; and in a case where a pixel value forming the G prediction tap is the input value B, a conversion value B' is operated.

The G prediction tap output from the G conversion unit 105-12 is supplied to the G product-sum operation unit 108-1. In addition, the G prediction tap output from the G conversion unit 105-12 includes the conversion value G', the conversion value R', and the conversion value B' which have been operated using the above Equations (1) to (3).

The G product-sum operation unit 108-1 assigns the G prediction tap which is output from the G conversion unit 105-12, to a linear first order equation set in advance, as a variable, and performs an operation of a prediction value by using the coefficient supplied from the G coefficient memory 107-1. In other words, the G product-sum operation unit 108-1 predictively operates a pixel value of a target pixel in a G component image (hereinafter, referred to as a G output image) which is an output image, on the basis of the G prediction tap.

Here, a description will be made of a predictive operation of the pixel value of the target pixel of the output image.

For example, it is assumed that image data output from the image sensor having the color filter array with the Bayer array is first image data, and image data output from the G component image sensor disposed in the frame 14 of FIG. 5 is second image data. In addition, it is considered that a pixel value of the second image data is obtained from a pixel value of the first image data through a predetermined predictive operation.

When, for example, a linear first order predictive operation is employed as the predetermined predictive operation, a pixel value y of a pixel of the second image data (hereinafter, appropriately referred to as a pixel of the second image) is obtained using the following linear first order equation.

$$y = \sum_{n=1}^{N} w_n x_n. \tag{4}$$

Here, in Equation (4), $x_n$ indicates a pixel value of an n-th pixel of the first image data (hereinafter, appropriately referred to as a pixel of the first image), forming the prediction tap for a pixel y of the second image, and $w_n$ indicates an n-th tap coefficient multiplied by the n-th pixel (a pixel value thereof) of the first image. In addition, in Equation (4), the prediction tap is formed by N pixels $x_1, x_2, \ldots,$ and $x_N$ of the first image.

Here, the pixel value y of the pixel of the second image may be obtained using second or higher order equations, instead of the linear first order equation represented by Equation (4).

Here, when a true value of a pixel value of a pixel of the second image of a k-th sample is denoted by $y_k$, and a prediction value of the true value $y_k$ obtained using Equation (4) is denoted by $y_k'$, a prediction error $e_k$ thereof is expressed by the following Equation.

$$e_k = y_k - y_k' \tag{5}$$

The prediction value $y_k'$ of Equation (5) is obtained according to Equation (4), and thus $y_k'$ of Equation (5) is replaced according to Equation (4), which leads to the following Equation.

$$e_k = y_k - \left( \sum_{n=1}^{N} w_n x_{n,k} \right) \tag{6}$$

Here, in Equation (6), $x_{n,k}$ indicates the n-th pixel of the first image forming the prediction tap for a pixel of the second image of the k-th sample.

A tap coefficient $w_n$ which produces the prediction error $e_k$ of Equation (6) (or Equation (5)) as 0 is the optimum in predicting a pixel of the second image, but it may be generally difficult to obtain such a tap coefficient $w_n$ for all pixels of the second image.

Therefore, if, for example, a least-square method is employed as a model indicating that the tap coefficient $w_n$ is the optimum, an optimal tap coefficient $w_n$ may be obtained by making a sum total E of square errors expressed by the following Equation minimum.

$$E = \sum_{k=1}^{K} e_k^2. \quad (7)$$

Here, in Equation (7), K indicates the number of samples (the number of samples for learning) of sets of a pixel $y_k$ of the second image and pixels $x_{1,k}, x_{2,k}, \ldots,$ and $x_{N,k}$ of the first image forming a prediction tap for the pixel $y_k$ of the second image.

A minimum value of the sum total E of square errors of Equation (7) is given by $w_n$ which produces, as 0, a result of partial differentiation of the sum total E using the tap coefficient $w_n$, as represented in Equation (8).

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \quad (8)$$

$(n = 1, 2, \ldots, N)$

Therefore, when partial differentiation is applied to the above Equation (6) by using the tap coefficient $w_n$, the following Equation may be obtained.

$$\frac{\partial e_k}{\partial w_1} = -x_{1,k}, \frac{\partial e_k}{\partial w_2} - x_{2,k}, \ldots, \frac{\partial e_k}{\partial w_N} = -x_{N,k}, \quad (9)$$

$(k = 1, 2, \ldots, K)$

The following Equation may be obtained from Equations (8) and (9).

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (10)$$

Equation (6) is assigned to $e_k$ of Equation (10), and thus Equation (10) may be expressed by a normal equation represented in Equation (11).

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (11)$$

The normal equation of Equation (11) can be solved with respect to the tap coefficient $w_n$ by using, for example, a sweep-out method (Gauss-Jordan elimination).

The normal equation of Equation (11) is taken and solved for each class, and thus an optimal tap coefficient (here, a tap coefficient which makes the sum total E of square errors minimum) $w_n$ can be obtained for each class. For example, the tap coefficient $w_n$ obtained in this way is stored in the G coefficient memory 107-1 as a G coefficient. In addition, a method of preliminarily obtaining the coefficient through learning will be described later in detail.

For example, the G prediction tap on which the process in the G conversion unit 105-12 has been performed is assigned to the pixels $x_1, x_2, \ldots,$ and $x_N$ of Equation (4), the tap coefficient $w_n$ of Equation (4) is supplied from the G coefficient memory 107-1, and then the operation of Equation (4) is performed by the G product-sum operation unit 108-1, thereby predicting a pixel value of a target pixel of the output image.

In this way, each target pixel is predicted, and thus the G output image can be obtained.

The R class tap selection unit 102-2 selects and acquires an R class tap which is a class tap necessary in generating an R component image, from the input image. The R class tap is formed by, for example, a predetermined number of pixels centering on a central pixel, and the central pixel is a pixel of the input image at a position corresponding to a target pixel of an output image.

The R class tap selected by the R class tap selection unit 102-2 is supplied to the R conversion unit 105-21. The R conversion unit 105-21 performs an R conversion process on each pixel value forming the R class tap.

The R conversion process is performed as follows, for example. In a case where a pixel value forming the R class tap is the input value G, a conversion value G' is operated; in a case where a pixel value forming the R class tap is the input value R, a conversion value R' is operated; and in a case where a pixel value forming the R class tap is the input value B, a conversion value B' is operated.

Here, the conversion value G', the conversion value R', and the conversion value B' are respectively operated using Equations (12) to (14).

$$G' = G - (Dg - Dr) \quad (12)$$

$$R' = R \quad (13)$$

$$B' = B - (Db - Dr) \quad (14)$$

It is possible to increase the correlation of each pixel value forming the R class tap by performing the R conversion process. In other words, each pixel value of the G pixel and the B pixel of the input image is offset with respect to the pixel value of the B pixel serving as a reference, and thus it is possible to remove a variation due to a color component difference of each pixel value forming the R class tap.

Referring to FIG. 6 again, the R class tap output from the R conversion unit 105-21 is supplied to the R class sorting unit 106-2. In addition, the R class tap output from the R conversion unit 105-21 includes the conversion value G', the conversion value R', and the conversion value B' which have been operated using the above Equations (12) to (14).

The R class sorting unit 106-2 codes the supplied R class tap by using adaptive dynamic range coding (ADRC) so as to generate a class code. The class code generated here is output to the R coefficient memory 107-2.

The R coefficient memory 107-2 reads a coefficient which is stored in correlation with the class code output from the R class sorting unit 106-2, and supplies the read coefficient to the R product-sum operation unit 105-2. In addition, the R coefficient memory 107-2 stores a coefficient which is obtained in advance through learning and is used in a product-sum operation described later, in correlation with the class code.

The R prediction tap selection unit 103-2 selects and acquires an R prediction tap which is a prediction tap necessary in generating an R component image from the input image. The R prediction tap is formed by, for example, a predetermined number of pixels centering on a central pixel, and the central pixel is a pixel of the input image at a position corresponding to a target pixel of an output image.

The R prediction tap selected by the R prediction tap selection unit 103-2 is supplied to the R conversion unit 105-22. The R conversion unit 105-22 performs an R conversion process on each pixel value forming the R prediction tap.

The R conversion process performed by the R conversion unit 105-22 is the same as the one performed by the R conversion unit 105-21. In other words, by using the above Equations (12) to (14), in a case where a pixel value forming the R prediction tap is the input value G, a conversion value G' is operated; in a case where a pixel value forming the R prediction tap is the input value R, a conversion value R' is operated; and in a case where a pixel value forming the R prediction tap is the input value B, a conversion value B' is operated.

The R prediction tap output from the R conversion unit 105-22 is supplied to the R product-sum operation unit 108-2. In addition, the R prediction tap output from the R conversion unit 105-21 includes the conversion value G', the conversion value R', and the conversion value B' which have been operated using the above Equations (12) to (14).

The R product-sum operation unit 108-2 assigns the R prediction tap which is output from the R conversion unit 105-22, to a linear first order equation set in advance, as a variable, and performs an operation of a prediction value by using the coefficient supplied from the R coefficient memory 107-2. In other words, the R product-sum operation unit 108-2 predictively operates a pixel value of a target pixel in an R component image (hereinafter, referred to as an R output image) which is an output image, on the basis of the R prediction tap.

For example, the R prediction tap on which the process in the R conversion unit 105-22 has been performed is assigned to the pixels and $x_N$ of Equation (4), the tap coefficient $w_n$ of Equation (4) is supplied from the R coefficient memory 107-2, and then the operation of Equation (4) is performed by the R product-sum operation unit 108-2, thereby predicting a pixel value of a target pixel of the output image.

In this way, each target pixel is predicted, and thus the R output image can be obtained.

The B class tap selection unit 102-3 selects and acquires a B class tap which a class tap is necessary in generating a B component image, from the input image. The B class tap is formed by, for example, a predetermined number of pixels centering on a central pixel, and the central pixel is a pixel of the input image at a position corresponding to a target pixel of an output image.

The B class tap selected by the B class tap selection unit 102-3 is supplied to the B conversion unit 105-31. The B conversion unit 105-31 performs a B conversion process on each pixel value forming the B class tap.

The B conversion process is performed as follows, for example. In a case where a pixel value forming the B class tap is the input value G, a conversion value G' is operated; in a case where a pixel value forming the B class tap is the input value R, a conversion value R' is operated; and in a case where a pixel value forming the B class tap is the input value B, a conversion value B' is operated.

Here, the conversion value G', the conversion value R', and the conversion value B' are respectively operated using Equations (15) to (17).

$$G'=G-(Dg-Db) \qquad (15)$$

$$R'=R-(Dr-Db) \qquad (16)$$

$$B'=B \qquad (17)$$

It is possible to increase the correlation of each pixel value forming the B class tap by performing the B conversion process. In other words, each pixel value of the G pixel and the R pixel of the input image is offset with respect to the pixel value of the B pixel serving as a reference, and thus it is possible to remove a variation due to a color component difference of each pixel value forming the B class tap.

Referring to FIG. 6 again, the B class tap output from the B conversion unit 105-31 is supplied to the B class sorting unit 106-3. In addition, the B class tap output from the B conversion unit 105-31 includes the conversion value G', the conversion value R', and the conversion value B' which have been operated using the above Equations (15) to (17).

The B class sorting unit 106-3 codes the supplied B class tap by using adaptive dynamic range coding (ADRC) so as to generate a class code. The class code generated here is output to the B coefficient memory 107-3.

The B coefficient memory 107-3 reads a coefficient which is stored in correlation with the class code output from the B class sorting unit 106-3, and supplies the read coefficient to the B product-sum operation unit 108-3. In addition, the B coefficient memory 107-3 stores a coefficient which is obtained in advance through learning and is used in a product-sum operation described later, in correlation with the class code.

The B prediction tap selection unit 103-3 selects and acquires a B prediction tap which is a prediction tap necessary in generating a B component image from the input image. The B prediction tap is formed by, for example, a predetermined number of pixels centering on a central pixel, and the central pixel is a pixel of the input image at a position corresponding to a target pixel of an output image.

The B prediction tap selected by the B prediction tap selection unit 103-3 is supplied to the B conversion unit 105-32. The B conversion unit 105-32 performs a B conversion process on each pixel value forming the B prediction tap.

The B conversion process performed by the B conversion unit 105-32 is the same as the one performed by the B conversion unit 105-31. In other words, by using the above Equations (15) to (17), in a case where a pixel value forming the B prediction tap is the input value G, a conversion value G' is operated; in a case where a pixel value forming the B prediction tap is the input value R, a conversion value R' is operated; and in a case where a pixel value forming the B prediction tap is the input value B, a conversion value B' is operated.

The B prediction tap output from the B conversion unit 105-32 is supplied to the B product-sum operation unit 108-3. In addition, the B prediction tap output from the B conversion unit 105-32 includes the conversion value G', the conversion value R', and the conversion value B' which have been operated using the above Equations (15) to (17).

The B product-sum operation unit 108-3 assigns the B prediction tap which is output from the B conversion unit 105-32, to a linear first order equation set in advance, as a variable, and performs an operation of a prediction value by using the coefficient supplied from the B coefficient memory 107-3. In other words, the B product-sum operation unit 108-3 predictively operates a pixel value of a target pixel in a B component image (hereinafter, referred to as a B output image) which is an output image, on the basis of the B prediction tap.

For example, the B prediction tap on which the process in the B conversion unit 105-32 has been performed is assigned to the pixels $x_1, x_2, \ldots,$ and $x_N$ of Equation (4), the tap coefficient $w_n$ of Equation (4) is supplied from the B coefficient memory 107-3, and then the operation of Equation (4) is performed by the B product-sum operation unit 108-3, thereby predicting a pixel value of a target pixel of the output image.

In this way, each target pixel is predicted, and thus the B output image can be obtained.

Configuration of Learning Apparatus

Next, a description will be made of learning of the coefficients stored in the G coefficient memory 107-1, the R coefficient memory 107-2, and the B coefficient memory 107-3.

Figure 11:
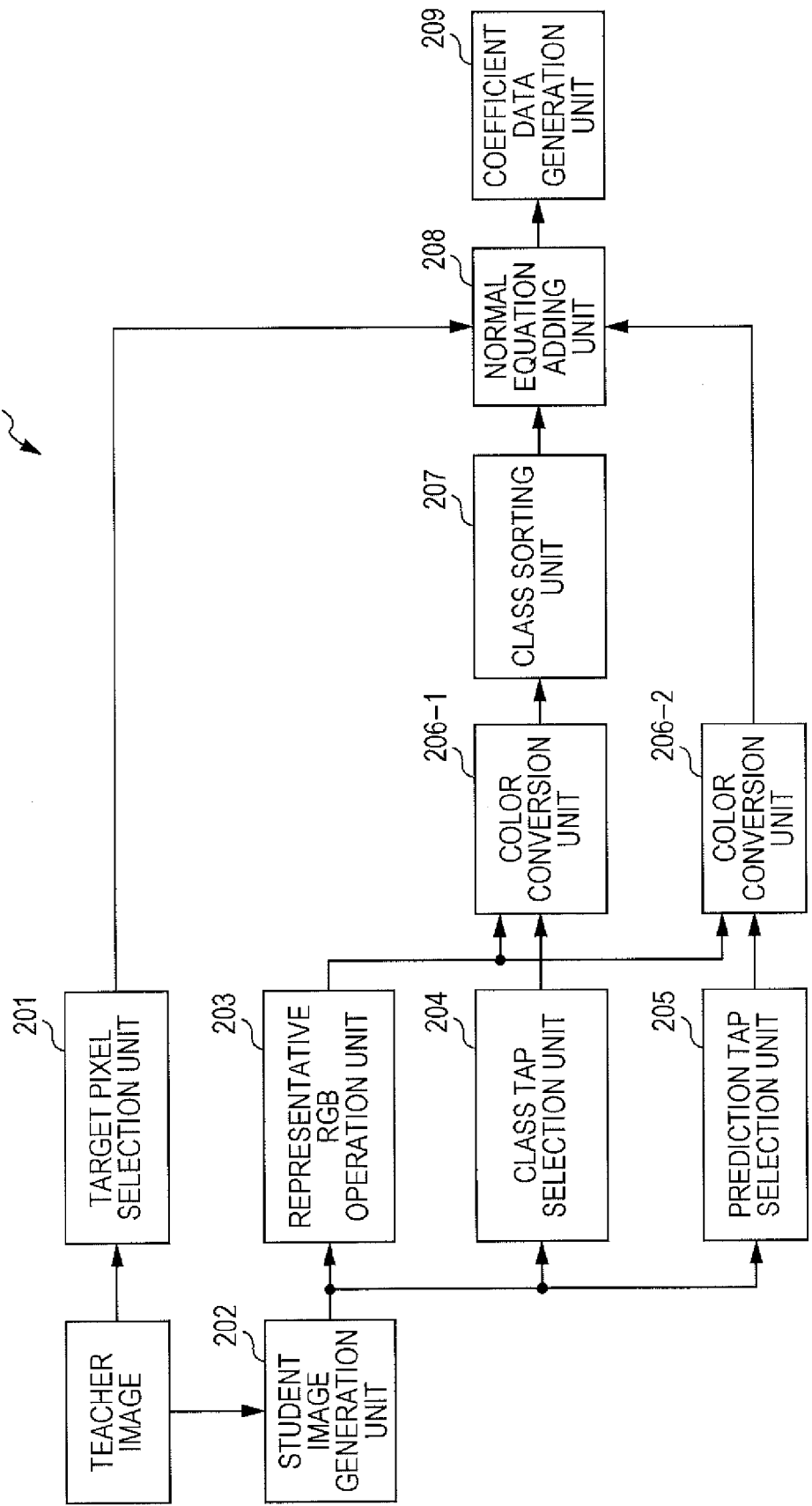
FIG. 11 is a diagram illustrating a configuration example of a learning apparatus corresponding to the image processing apparatus of FIG. 6.

FIG. 11 is a block diagram illustrating a configuration example of a learning apparatus corresponding to the image processing apparatus 100 of FIG. 6.

A learning apparatus 200 illustrated in FIG. 11 includes a target pixel selection unit 201, a student image generation unit 202, a representative RGB operation unit 203, a class tap selection unit 204, a prediction tap selection unit 205, a color conversion unit 206-1, a color conversion unit 206-2, a class sorting unit 207, a normal equation adding unit 208, and a coefficient data generation unit 209.

In a case where learning of a coefficient is performed in the learning apparatus 200, a G component image, an R component image, and a B component image, which are obtained, for example, by disposing three image sensors respectively corresponding to an R component, a G component, and a B component in the frame 14 of FIG. 5, are prepared as teacher images.

The student image generation unit 202 makes the teacher images deteriorate by using, for example, a simulation model of an optical low-pass filter, and also generates an image output from an image sensor which includes pixels disposed according to the Bayer array. The image generated in this way is used as a student image.

The target pixel selection unit 201 selects any one pixel in the teacher image as a target pixel. In addition, a coordinate value and the like of a pixel selected as the target pixel is supplied to the representative RGB operation unit 203, the class tap selection unit 204, and the prediction tap selection unit 205.

The representative RGB operation unit 203 calculates a representative value Dg, a representative value Dr, and a representative value Db in relation to pixels in a designated region of the student image, in the same manner as the representative RGB operation unit 101 of FIG. 6. In addition, the designated region is set to a predetermined region centering on a pixel at a position corresponding to the target pixel selected by the target pixel selection unit 201.

The class tap selection unit 204 selects and acquires a class tap from the pixels in the designated region of the student image. In addition, in a case where the target pixel selection unit 201 selects the target pixel from the G component image of the teacher images, the class tap selection unit 204 selects a G class tap. Further, in a case where the target pixel selection unit 201 selects the target pixel from the R component image of the teacher images, the class tap selection unit 204 selects an R class tap, and in a case where the target pixel selection unit 201 selects the target pixel from the B component image of the teacher images, the class tap selection unit 204 selects a B class tap.

The prediction tap selection unit 205 selects and acquires a prediction tap from the pixels in the designated region of the student image. In addition, in a case where the target pixel selection unit 201 selects the target pixel from the G component image of the teacher images, the prediction tap selection unit 205 selects a G prediction tap. Further, in a case where the target pixel selection unit 201 selects the target pixel from the R component image of the teacher images, the prediction tap selection unit 205 selects an R prediction tap, and in a case where the target pixel selection unit 201 selects the target pixel from the B component image of the teacher images, the prediction tap selection unit 205 selects a B prediction tap.

The color conversion unit 206-1 performs a predetermined conversion process on the class tap acquired by the class tap selection unit 204. Here, in a case where the G class tap is acquired by the class tap selection unit 204, the color conversion unit 206-1 performs the G conversion process thereon. In addition, in a case where the R class tap is acquired by the class tap selection unit 204, the color conversion unit 206-1 performs the R conversion process thereon, and in a case where the B class tap is acquired by the class tap selection unit 204, the color conversion unit 206-1 performs the B conversion process thereon.

The class tap having undergone the process in the color conversion unit 206-1 is supplied to the class sorting unit 207.

The color conversion unit 206-2 performs a predetermined conversion process on a prediction tap acquired by the prediction tap selection unit 205. Here, in a case where the G prediction tap is acquired by the prediction tap selection unit 205, the color conversion unit 206-2 performs the G conversion process thereon. In addition, in a case where the R prediction tap is acquired by the prediction tap selection unit 205, the color conversion unit 206-2 performs the R conversion process thereon, and in a case where the B prediction tap is acquired by the prediction tap selection unit 205, the color conversion unit 206-2 performs the B conversion process thereon.

The prediction tap having undergone the process in the color conversion unit 206-2 is supplied to the normal equation adding unit 208.

The class sorting unit 207 codes the supplied class tap by using adaptive dynamic range coding (ADRC) so as to generate a class code. The class code generated here is supplied to the normal equation adding unit 208 along with the class tap.

The normal equation adding unit 208 generates the linear first order equation represented in, for example, the above Equation (4). At this time, the class tap having undergone the process in the color conversion unit is used as the pixels $x_1, x_2, \ldots,$ and $x_N$ of Equation (4).

If the target pixel selection unit 201 selects a new target pixel, a new linear first order equation is generated in the same manner in the above-described case. The normal equation adding unit 208 adds the linear first order equation generated in this way to each class code so as to generate the normal equation of Equation (11).

The coefficient data generation unit 209 solves the normal equation of Equation (11) with respect to the tap coefficient $w_n$, by using, for example, a sweep-out method (Gauss-Jordan elimination). In addition, the coefficient data generation unit 209 outputs the obtained tap coefficient $w_n$ as a G coefficient necessary in performing a predictive operation of the G output image, as an R coefficient necessary in performing a predictive operation of the R output image, and as a B coefficient necessary in performing a predictive operation of the B output image, on the basis of the kinds of teacher images (the C component image, the R component image, and the B component image) where the target pixel is set.

The C coefficient, the R coefficient, and the B coefficient for the respective class codes, obtained in this way, are respectively stored in the G coefficient memory 107-1, the R coefficient memory 107-2, and the B coefficient memory 107-3 of FIG. 6.

In this way, learning of the coefficients is performed.
Examples of structure of class tap or prediction tap FIGS. 12A to 12D are diagrams illustrating examples of a structure of a class tap or a prediction tap acquired in the image processing apparatus 100 of FIG. 6 or the learning apparatus 200 of FIG. 11. Here, the class tap is the general term for the above-described G class tap, R class tap, and B class tap, and the prediction tap is the general term for the above-described G prediction tap, R prediction tap, and B prediction tap.

The examples of FIGS. 12A to 12D illustrate the class tap or the prediction tap formed by nine (=3×3) pixels centering on a pixel (central pixel) of an input image corresponding to a target pixel of an output image. In addition, here, an example of a structure of the class tap or the prediction tap is illustrated in a case where, in pixels with the Bayer array which is configured in the unit of four pixels (one R component pixel, one B component pixel, and two G component pixels), each of the four pixels in the unit is set as a central pixel.

Figure 12:
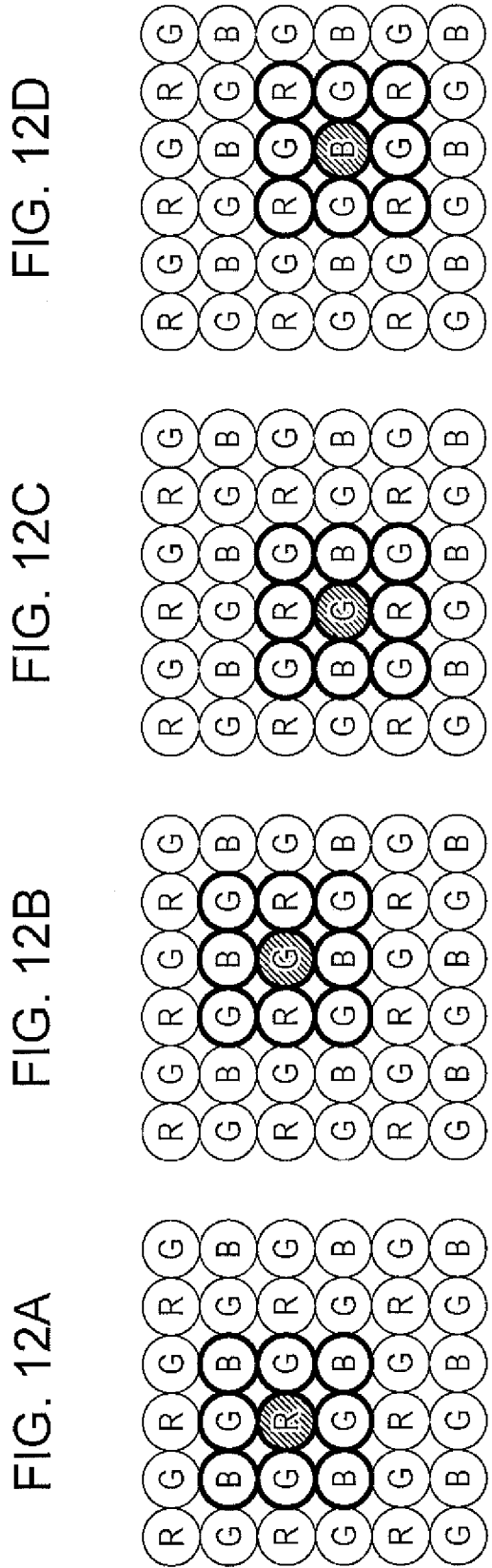
FIGS. 12A to 12D are diagrams illustrating examples of a structure of a class tap or a prediction tap which is acquired in the image processing apparatus of FIG. 6 or the learning apparatus of FIG. 11.

FIG. 12A is a diagram illustrating an example of the class tap or the prediction tap in a case where the R component pixel of the pixels with the Bayer array is used as a central pixel.

FIG. 12B is a diagram illustrating an example of the class tap or the prediction tap in a case where the G component pixel of the pixels with the Bayer array is used as a central pixel.

FIG. 12C is a diagram illustrating an example of the class tap or the prediction tap in a case where another G component pixel of the pixels with the Bayer array is used as a central pixel.

FIG. 12D is a diagram illustrating an example of the class tap or the prediction tap in a case where the B component pixel of the pixels with the Bayer array is used as a central pixel.

In addition, the class tap and the prediction tap may or may not have the same structure. Further, in the class taps, the G class tap, the R class tap, and the B class tap may or may not have the same structure. Similarly, in the prediction taps, the G prediction tap, the R prediction tap, and the B prediction tap may or may not have the same structure.

Image Process Performed by Image Processing Apparatus

Figure 13:
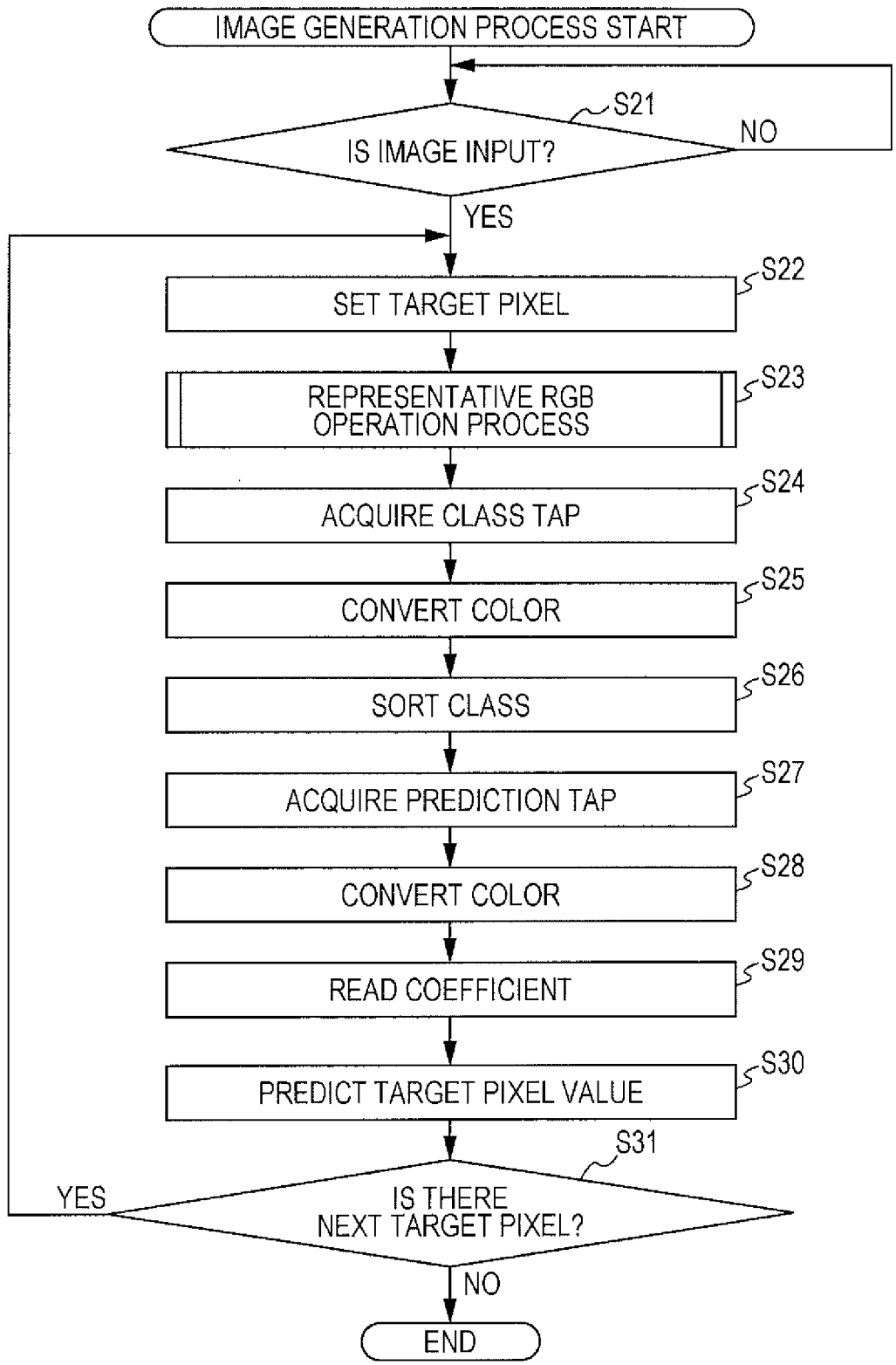
FIG. 13 is a flowchart illustrating an example of an image process performed by the image processing apparatus of FIG. 6.

FIG. 13 is a flowchart illustrating an example of an image process performed by the image processing apparatus 100 of FIG. 6.

In step S21, it is determined whether or not an image (input image) which is a target of the image process is input, and waiting is performed until it is determined that the image is input. If it is determined that the image is input in step S21, the process proceeds to step S22.

In addition, as described above, the input image is an image which is formed by output values of the image sensor using, for example, a color filter array with the Bayer array. Therefore, in the input image, an R component image signal is obtained from a pixel in which an R filter is disposed, but G component and B component image signals are not obtained therefrom. Similarly, only a G component image signal is obtained from a G pixel, and R component and B component image signals are not obtained therefrom. Only a B component image signal is obtained from a B pixel, and R component and G component image signals are not obtained therefrom.

In step S22, a target pixel is set. Accordingly, a central pixel in the input image is determined.

Figure 14:
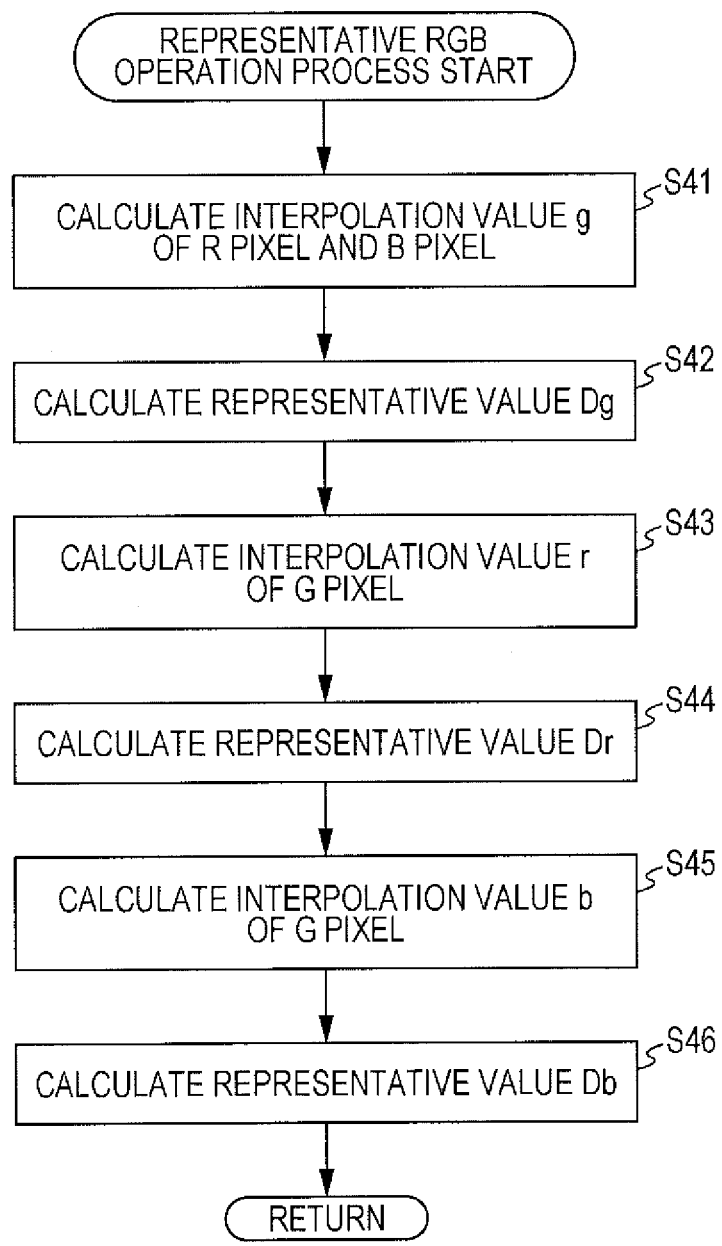
FIG. 14 is a flowchart illustrating an example of a representative RGB operation process.

In step S23, the representative RGB operation unit 101 performs a representative RGB operation process described later with reference to FIG. 14. Accordingly, the above-described representative value Dg, representative value Dr, and representative value Db are operated.

In step S24, the G class tap selection unit 102-1, the R class tap selection unit 102-2, or the B class tap selection unit 102-3 respectively acquires a G class tap, an R class tap, or a B class tap.

In a case where a G output image is generated, the G class tap is acquired. In a case where an R output image is generated, the R class tap is acquired. In a case where a B output image is generated, the B class tap is acquired. Hereinafter, for simplification of description, the case of generating the G output image will be described.

In step S25, color conversion is performed. For example, in a case of generating the G output image, the G conversion unit 105-11 performs the G conversion. At this time, the conversion value G', the conversion value R', and the conversion value B' are operated using the above Equations (1) to (3).

In step S26, class sorting is performed. For example, in a case of generating the G output image, the G class sorting unit 106-1 codes the supplied G class tap by using adaptive dynamic range coding (ADRC), so as to generate a class code, thereby performing the class sorting.

In step S27, a prediction tap is acquired. For example, in a case of generating the G output image, the G prediction tap selection unit 103-1 acquires a G prediction tap.

In step S28, color conversion is performed. For example, in a case of generating the G output image, the G conversion unit 105-12 performs the G conversion. At this time, the conversion value G', the conversion value R', and the conversion value B' are operated using the above Equations (1) to (3).

In step S29, a coefficient is read. For example, in a case of generating the G output image, a coefficient, which is stored in correlation with the class code generated due to the process in step S26, is read from the G coefficient memory 107-1.

In step S30, a target pixel value is predicted. For example, in a case of generating the G output image, the G prediction tap having undergone the color conversion due to the process in step S28 is assigned to the pixels $x_1, x_2, \ldots,$ and $x_N$ of Equation (4), the coefficient read due to the process in step S29 is supplied as the tap coefficient $w_n$ of Equation (4), and then the operation of Equation (4) is performed by the G product-sum operation unit 108-1, thereby predicting a pixel value of the target pixel of the output image.

In step S31, it is determined whether or not there is the next target pixel, and if it is determined that there is the next target pixel, the process returns to step S22, and the subsequent processes are repeatedly performed.

If it is determined that there is no next target pixel in step S31, the process ends.

In this way, the image generation process is performed.
Representative RGB Operation Process Next, with reference to a flowchart of FIG. 14, a specific example of the representative RGB operation process in step S23 of FIG. 13 will be described.

In step S41, the representative RGB operation unit 101 calculates an interpolation value g of the R component pixel and the B component pixel in the designated region of the input image. At this time, for example, as illustrated in FIG. 8, an input value G1 to an input value G4 of the pixel G1 to the pixel G4 which are four peripheral pixels (top and bottom and right and left) of the central pixel in the designated region are averaged, thereby calculating the interpolation value g which is a value of the G component interpolated at the pixel position of the central pixel.

In step S42, the representative RGB operation unit 101 calculates a representative value Dg. At this time, an average value of input values G of all the G pixels in the designated region and the interpolation value g calculated in step S41 is calculated as a representative value Dg.

In step S43, the representative RGB operation unit 101 calculates an interpolation value r of the G component pixel. For example, in a case of calculating the interpolation value r at the position of the pixel G1 or the pixel G4 of FIG. 8, as illustrated in FIG. 9, an average value of the pixel R2 and the pixel R1 which are adjacent to the G pixel on both of right and left sides is regarded as the interpolation value r.

Accordingly, the input value G and the interpolation value r can be obtained at the pixel position of the G pixel in the designated region, and an input value R and an interpolation value g can be obtained at the pixel position of the R pixel in the designated region.

In step S44, the representative RGB operation unit 101 calculates a representative value Dr. At this time, (interpolation value r—input value G) and (input value R—interpolation value g) are calculated at each pixel position, and a value obtained by adding the representative value Dg to an average value of the calculated (interpolation value r—input value G) and (input value R—interpolation value g) is calculated as the representative value Dr.

In step S45, the representative RGB operation unit 101 calculates an interpolation value b of the G component pixel. For example, in a case of calculating the interpolation value b at the position of the pixel G1 or the pixel G4 of FIG. 8, as illustrated in FIG. 10, an average value of the pixel B1 and the pixel B2 which are adjacent to the G pixel on both of top and bottom sides is regarded as the interpolation value b.

Accordingly, the input value G and the interpolation value b can be obtained at the pixel position of the G pixel in the designated region, and an input value B and an interpolation value g can be obtained at the pixel position of the B pixel in the designated region.

In step S46, the representative RGB operation unit 101 calculates a representative value Db. At this time, (interpolation value b—input value G) and (input value B—interpolation value g) are calculated at each pixel position, and a value obtained by adding the representative value Dg to an average value of the calculated (interpolation value b—input value G) and (input value B—interpolation value g) is calculated as the representative value Db.

In this way, the representative RGB operation process is performed.

Coefficient Learning Process Performed by Learning Apparatus

Figure 15:
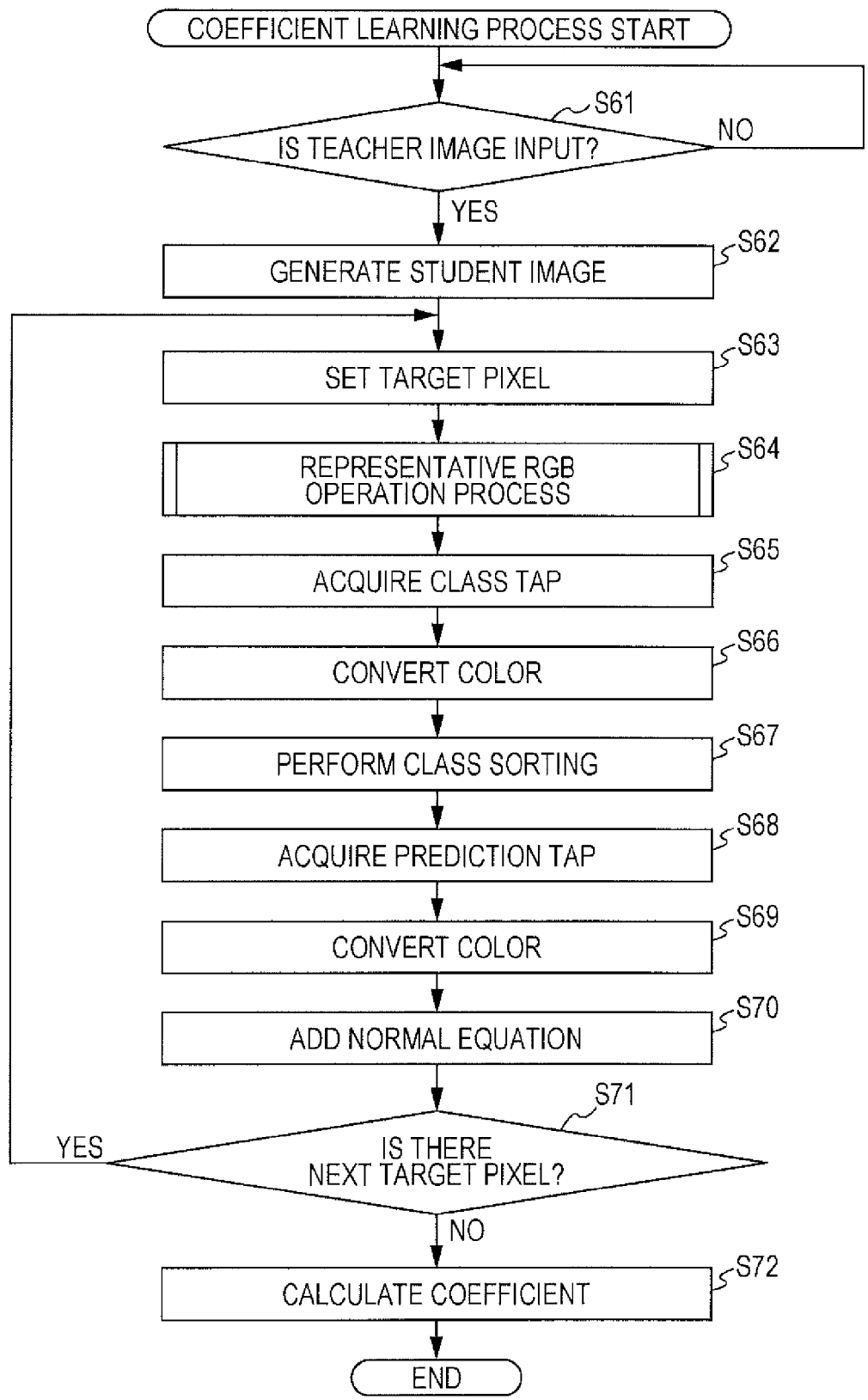
FIG. 15 is a flowchart illustrating an example of a coefficient learning process performed by the learning apparatus of FIG. 11.

Next, a description will be made of an example of a coefficient learning process performed by the learning apparatus 200 of FIG. 11 with reference to a flowchart of FIG. 15.

In step S61, it is determined whether or not teacher images are input, and waiting is performed until it is determined that the teacher images are input. If it is determined that the teacher images are input in step S61, the process proceeds to step S62.

As described above, the teacher images are a G component image, an R component image, and a B component image, which are obtained, for example, by disposing three image sensors respectively corresponding to an R component, a G component, and a B component in the frame 14 of FIG. 5.

In step S62, the student image generation unit 202 generates a student image. At this time, the teacher images are made to deteriorate by using, for example, a simulation model of an optical low-pass filter, and an image output from an image sensor which includes pixels disposed according to the Bayer array is generated and used as the student image.

In step S63, the target pixel selection unit 201 selects (sets) any one pixel in the teacher image as a target pixel. Accordingly, a central pixel in the student image is determined.

In step S64, the representative RGB operation unit 203 performs the representative RGB operation process described with reference to the flowchart of FIG. 14. Accordingly, the representative value Dg, the representative value Dr, and the representative value Db are calculated.

In step S65, the class tap selection unit 204 selects and acquires a class tap from the pixels in the designated region of the student image.

Here, in a case where the target pixel selection unit 201 selects the target pixel from the G component image of the teacher images, the class tap selection unit 204 selects a G class tap. Further, in a case where the target pixel selection unit 201 selects the target pixel from the R component image of the teacher images, the class tap selection unit 204 selects an R class tap, and in a case where the target pixel selection unit 201 selects the target pixel from the B component image of the teacher images, the class tap selection unit 204 selects a B class tap.

In step S66, the color conversion unit 206-1 performs a predetermined conversion process on the class tap acquired due to the process in step S65.

Here, in a case where the G class tap is acquired by the class tap selection unit 204, the color conversion unit 206-1 performs the G conversion process thereon. In addition, in a case where the R class tap is acquired by the class tap selection unit 204, the color conversion unit 206-1 performs the R conversion process thereon, and in a case where the B class tap is acquired by the class tap selection unit 204, the color conversion unit 205-1 performs the B conversion process thereon.

In step S67, the class sorting unit 207 codes the supplied class tap by using adaptive dynamic range coding (ADRC) so as to generate a class code. The class code generated here is supplied to the normal equation adding unit 208 along with the class tap.

In step S68, the prediction tap selection unit 205 selects and acquires a prediction tap from the pixels in the designated region of the student image.

Here, in a case where the target pixel selection unit 201 selects the target pixel from the G component image of the teacher images, the prediction tap selection unit 205 selects a G prediction tap. Further, in a case where the target pixel selection unit 201 selects the target pixel from the R component image of the teacher images, the prediction tap selection unit 205 selects an R prediction tap, and in a case where the target pixel selection unit 201 selects the target pixel from the B component image of the teacher images, the prediction tap selection unit 205 selects a B prediction tap.

In step S69, the color conversion unit 206-2 performs a predetermined conversion process on the prediction tap acquired due to the process in step S68.

Here, in a case where the G prediction tap is acquired by the prediction tap selection unit 205, the color conversion unit 206-2 performs the G conversion process thereon. In addition, in a case where the R prediction tap is acquired by the prediction tap selection unit 205, the color conversion unit 206-2 performs the R conversion process thereon, and in a case where the B prediction tap is acquired by the prediction tap selection unit 205, the color conversion unit 206-2 performs the B conversion process thereon.

In step S70, the normal equation adding unit 208 performs addition of the normal equation.

As described above, the normal equation adding unit 208 generates the linear first order equation represented in, for example, the above Equation (4), and the class tap having undergone the process in the color conversion unit is used as the pixels $x_1, x_2, \ldots,$ and $x_N$ of Equation (4). In addition, the normal equation adding unit 208 adds the linear first order equation generated in this way to each class code generated due to the process in step S67 so as to generate the normal equation of Equation (11).

In step S71, it is determined whether or not there is the next target pixel, and if it is determined that there is the next target pixel, the process returns to step S63, and the subsequent processes are repeatedly performed.

If it is determined that there is no next target pixel in step S71, the process proceeds to step S72.

In step S72, the coefficient data generation unit 209 calculates a coefficient.

At this time, as described above, the coefficient data generation unit 209 solves the normal equation of Equation (11) with respect to the tap coefficient $w_n$, by using, for example, a sweep-out method (Gauss-Jordan elimination). In addition, the coefficient data generation unit 209 outputs the obtained tap coefficient $w_n$ as a G coefficient necessary in performing a predictive operation of the G output image, as an R coefficient necessary in performing a predictive operation of the R output image, and as a B coefficient necessary in performing a predictive operation of the B output image, on the basis of the kinds of teacher images (the G component image, the R component image, and the B component image) where the target pixel is set.

The G coefficient, the R coefficient, and the B coefficient for the respective class codes, obtained in this way, are respectively stored in the G coefficient memory 107-1, the R coefficient memory 107-2, and the B coefficient memory 107-3 of FIG. 6, and are read due to the process in step S29 of FIG. 13.

In this way, the coefficient learning process is performed.

2. Second Embodiment

In the embodiment described with reference to FIG. 6, the G output image, the R output image, and the B output image may be generated together. However, in the Bayer array, the number of G pixels per unit area is large, and thus prediction accuracy is high. In addition, due to characteristics of color filters, G has a more favorable S/N ratio than R or B. For this reason, for example, the G output image may be first generated, and the R output image and the B output image may be generated using the generated G output image. In this way, it is possible to perform an image process with higher quality in terms of an amount of noise or a resolution (frequency characteristic).

In addition, since the zipper noise occurs at a location where there is a local color difference variation in an input image, only a G component pixel is used in each prediction tap, and thus it is possible to prevent an influence of local variations in R component and B component pixel values. In this way, even if local variations occur in the R component and B component pixel values around a central pixel, it is possible to reduce the zipper noise occurring in an output image if a variation in the G component pixel value is small.

Configuration of Image Processing Apparatus

Figure 16:
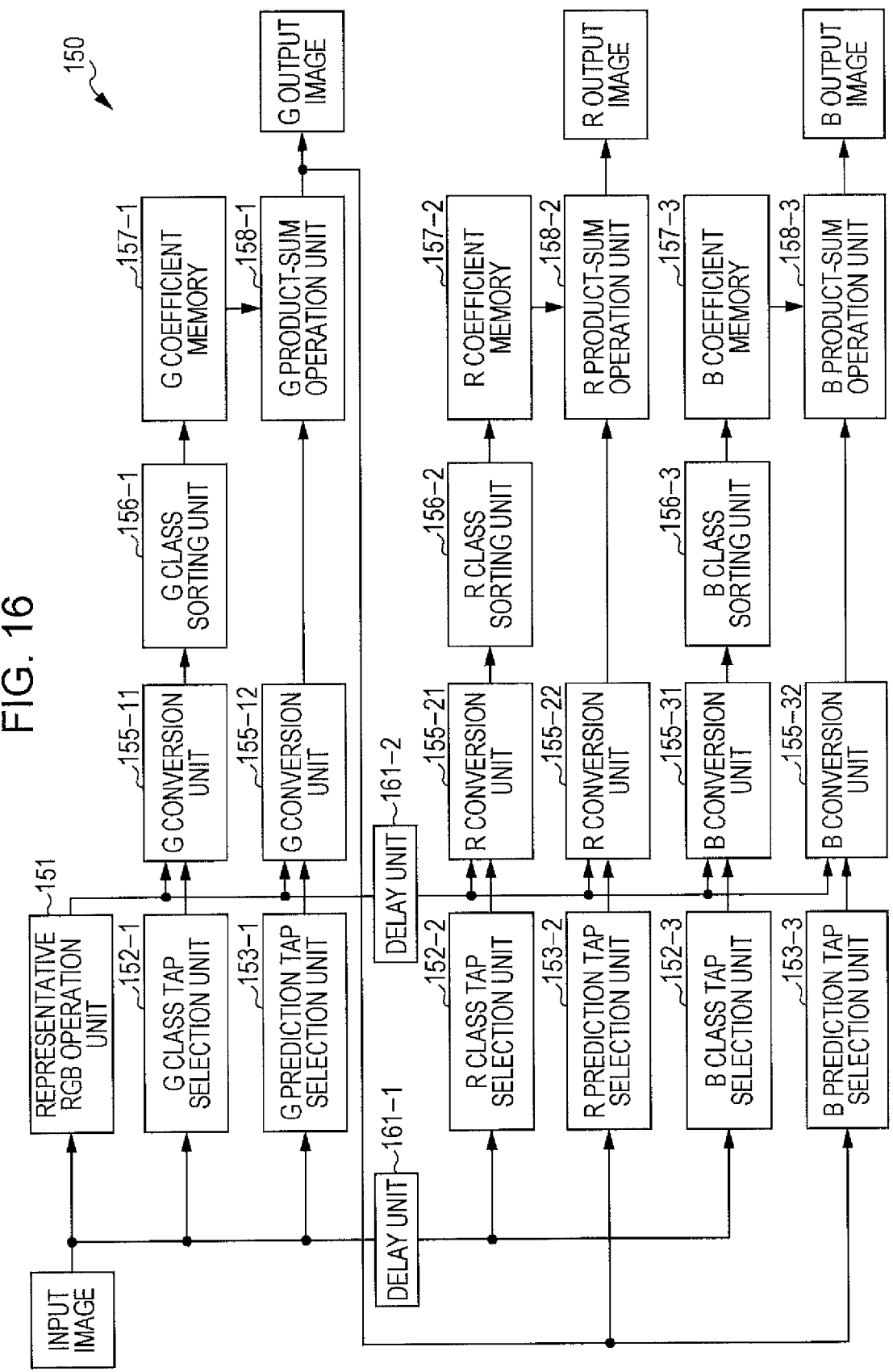
FIG. 16 is a block diagram illustrating a configuration example according to an embodiment of an image processing apparatus to which the present technology is applied.

FIG. 16 is a block diagram illustrating a configuration example according to an embodiment of an image processing apparatus to which the present technology is applied. An image processing apparatus 150 illustrated in FIG. 16 first generates a G output image, and then generates an R output image and a B output image by using the generated G output image. In addition, in the image processing apparatus 150 illustrated in FIG. 16, each prediction tap includes only a G component pixel as a countermeasure for reducing the zipper noise which occurs in an output image.

The representative RGB operation unit 151 of FIG. 16 has the same configuration as the representative RGB operation unit 101 of FIG. 6, and thus detailed description thereof will not be repeated.

The G class tap selection unit 152-1 selects and acquires a G class tap which a class tap is necessary in generating a G component image, from the input image. The G class tap is formed by, for example, a predetermined number of pixels centering on a central pixel, and the central pixel is a pixel of the input image at a position corresponding to a target pixel of an output image.

The G class tap selected by the G class tap selection unit 152-1 is supplied to the G conversion unit 155-11. The G conversion unit 155-11 performs a G conversion process on each pixel value forming the G class tap.

A G conversion process performed by the G conversion unit 155-11 is the same as the one performed by the G conversion unit 105-11 of FIG. 6. In other words, by using the above Equations (1) to (3), in a case where a pixel value forming the G class tap is the input value G, a conversion value G' is operated; in a case where a pixel value forming the G class tap is the input value R, a conversion value R' is operated; and in a case where a pixel value forming the G class tap is the input value B, a conversion value B' is operated.

The G class tap output from the G conversion unit 155-11 is supplied to the G class sorting unit 156-1.

The G class sorting unit 156-1 codes the supplied G class tap by using adaptive dynamic range coding (ADRC) so as to generate a class code. The class code generated here is output to the G coefficient memory 157-1.

The G coefficient memory 157-1 reads a coefficient which is stored in correlation with the class code output from the G class sorting unit 156-1, and supplies the read coefficient to the G product-sum operation unit 158-1. In addition, the G coefficient memory 157-1 stores a coefficient which is obtained in advance through learning and is used in a product-sum operation described later, in correlation with the class code.

In addition, in a case of using the image processing apparatus 150 with the configuration of FIG. 16, when learning of the coefficient stored in the G coefficient memory 157-1 is performed, for example, a G component image, which is obtained by disposing an image sensor corresponding to a G component in the frame 14 of FIG. 5, is used as a teacher image, and learning for generating a G output image is performed.

The G prediction tap selection unit 153-1 selects and acquires a G prediction tap which is a prediction tap necessary in generating a G component image from the input image. The G prediction tap is formed by, for example, a predetermined number of pixels centering on a central pixel, and the central pixel is a pixel of the input image at a position corresponding to a target pixel of an output image. In addition, in a case of FIG. 16, unlike in the case of FIG. 6, only a G component pixel is selected by the G prediction tap selection unit 153-1 from the input image. Therefore, in this case, the G prediction tap is formed by only the G component pixel.

The G prediction tap selected by the G prediction tap selection unit 153-1 is supplied to the G conversion unit 155-12. The G conversion unit 155-12 performs a G conversion process on each pixel value forming the G prediction tap.

The G conversion process here is performed as follows, for example.

Also in FIG. 16, the G prediction tap is selected from the input image by the G prediction tap selection unit 153-1, but, unlike in FIG. 6, the G prediction tap is formed by only the G component pixels. Therefore, the G conversion unit 155-12 performs the above-described operation of Equation (1) on each pixel value forming the G prediction tap so as to calculate a conversion value G'. The G prediction tap output from the G conversion unit 155-12 is supplied to the G product-sum operation unit 158-1.

The G product-sum operation unit 158-1 has the same configuration as the G product-sum operation unit 108-1 of FIG. 6, and predictively operates a pixel value of a target pixel in a G output image on the basis of the G prediction tap.

In this way, each target pixel is predicted, and thus the G output image can be obtained. However, the G output image obtained here is operated by assigning the G prediction tap including only the G component to the preset linear first order equation and by using the coefficient correlated with the class code generated from the G class tap which is formed by the respective R, G and B components.

The G output image obtained in this way uses only the G component pixel in the G prediction tap and is thus hardly influenced by an influence of local variations in the R component and B component pixel values. In addition, since the pixels of the respective R, G and B components are used in the G class tap, the R component and B component pixels can be correlated with class codes. Therefore, a resolution of the G output image is not reduced even if the G prediction tap is formed by only the G component pixel.

In addition, in a case of the configuration of FIG. 16, unlike in the case of FIG. 6, the input image is supplied to the R class tap selection unit 152-2 and the B class tap selection unit 152-3 via a delay unit 161-1. Further, in a case of the configuration of FIG. 16, unlike in the case of FIG. 6, data output from the representative RGB operation unit 151 is supplied to the R conversion unit 155-21 and the R conversion unit 155-22, and the B conversion unit 155-31 and the B conversion unit 155-32 via a delay unit 161-2.

Furthermore, in a case of the configuration of FIG. 16, unlike in the case of FIG. 6, data output from the G product-sum operation unit 158-1 is supplied to the R prediction tap selection unit 153-2 and the B prediction tap selection unit 153-3.

The R class tap selection unit 152-2 selects and acquires an R class tap which a class tap is necessary in generating an R component image, from the input image. The R class tap is formed by, for example, a predetermined number of pixels centering on a central pixel, and the central pixel is a pixel of the input image at a position corresponding to a target pixel of an output image.

The R class tap selected by the R class tap selection unit 152-2 is supplied to the R conversion unit 155-21. The R conversion unit 155-21 performs an R conversion process on each pixel value forming the R class tap.

The R conversion process performed by the R conversion unit 155-21 is the same as the one performed by the R conversion unit 105-21 of FIG. 6. In other words, by using the above Equations (12) to (14), in a case where a pixel value forming the R class tap is the input value G, a conversion value G' is operated; in a case where a pixel value forming the R class tap is the input value R, a conversion value R' is operated; and in a case where a pixel value forming the R class tap is the input value B, a conversion value B' is operated.

The R class tap output from the R conversion unit 155-21 is supplied to the R class sorting unit 156-2.

The R class sorting unit 156-2 codes the supplied R class tap by using adaptive dynamic range coding (ADRC) so as to generate a class code. The class code generated here is output to the R coefficient memory 157-2.

The R coefficient memory 157-2 reads a coefficient which is stored in correlation with the class code output from the R class sorting unit 156-2, and supplies the read coefficient to the R product-sum operation unit 158-2. In addition, the R coefficient memory 157-2 stores a coefficient which is obtained in advance through learning and is used in a product-sum operation described later, in correlation with the class code.

In addition, in a case of using the image processing apparatus 150 with the configuration of FIG. 16, when learning of the coefficient stored in the R coefficient memory 157-2 is performed, for example, an R component image, which is obtained by disposing an image sensor corresponding to an R component in the frame 14 of FIG. 5, is used as a teacher image, and learning for generating an R output image is performed.

The R prediction tap selection unit 153-2 selects and acquires an R prediction tap which is a prediction tap necessary in generating the R component image from the G output image. The R prediction tap is formed by, for example, a predetermined number of pixels centering on a central pixel, and the central pixel is a pixel of the G output image at a position corresponding to a target pixel of an output image. In addition, in a case of FIG. 16, unlike in the case of FIG. 6, the R prediction tap is selected by the R prediction tap selection unit 153-2 from the G output image. Therefore, in this case, the R prediction tap is formed by only the G component pixel.

The R prediction tap selected by the R prediction tap selection unit 153-2 is supplied to the R conversion unit 155-22. The R conversion unit 155-22 performs an R conversion process on each pixel value forming the R prediction tap.

The R conversion process here is performed as follows, for example.

In a case of FIG. 16, unlike in the case of FIG. 6, the R prediction tap is selected from the G output image by the R prediction tap selection unit 153-2. Therefore, in this case, the R prediction tap is formed by only the G component pixels. Here, a G component pixel of the G output image is indicated by a prediction value Gp.

$$Gp' = Gp - (Dg - Dr) \quad (18)$$

It is possible to increase the correlation of each pixel value forming the R prediction tap by performing the R conversion process. In other words, a pixel value of the G output image is offset with respect to a pixel value of the R pixel of the input image, serving as a reference, and thus it is possible to remove a variation due to a color component difference of each pixel value forming the R prediction tap.

The R prediction tap output from the R conversion unit 155-22 is supplied to the R product-sum operation unit 158-2. In addition, the R prediction tap output from the R conversion unit 155-22 includes the conversion value Gp' which has been operated using the above Equation (18).

The R product-sum operation unit 158-2 has the same configuration as the R product-sum operation unit 108-2 of FIG. 6, and predictively operates a pixel value of a target pixel in an R output image on the basis of the R prediction tap.

In this way, each target pixel is predicted, and thus the R output image can be obtained. However, the R output image obtained here is operated by assigning the R prediction tap including only the G component to the preset linear first order equation and by using the coefficient correlated with the class code generated from the R class tap which is formed by the respective R, G and B components.

The R output image obtained in this way uses only the G component pixel in the R prediction tap and is thus hardly influenced by an influence of local variations in the R component and B component pixel values. In addition, since the pixels of the respective components of R, G and B are used in the R class tap, the R component and B component pixels can be correlated with class codes. Therefore, a resolution of the R output image is not reduced even if the R prediction tap is formed by only the G component pixel.

In addition, in a case of the configuration of FIG. 16, the B class tap selection unit 152-3 selects and acquires a B class tap which a class tap is necessary in generating a B component image, from the input image. The B class tap is formed by, for example, a predetermined number of pixels centering on a central pixel, and the central pixel is a pixel of the input image at a position corresponding to a target pixel of an output image.

The B class tap selected by the B class tap selection unit 152-3 is supplied to the B conversion unit 155-31. The B conversion unit 155-31 performs a B conversion process on each pixel value forming the B class tap.

A B conversion process performed by the B conversion unit 155-31 is the same as the one performed by the B conversion unit 105-31 of FIG. 6. In other words, by using the above Equations (15) to (17), in a case where a pixel value forming the B class tap is the input value G, a conversion value G' is operated; in a case where a pixel value forming the B class tap is the input value R, a conversion value R' is operated; and in a case where a pixel value forming the B class tap is the input value B, a conversion value B' is operated.

The B class tap output from the B conversion unit 155-31 is supplied to the B class sorting unit 156-3.

The B class sorting unit 156-3 codes the supplied B class tap by using adaptive dynamic range coding (ADRC) so as to generate a class code. The class code generated here is output to the B coefficient memory 157-3.

The B coefficient memory 157-3 reads a coefficient which is stored in correlation with the class code output from the B class sorting unit 156-3, and supplies the read coefficient to the B product-sum operation unit 158-3. In addition, the B coefficient memory 157-3 stores a coefficient which is obtained in advance through learning and is used in a product-sum operation described later, in correlation with the class code.

In addition, in a case of using the image processing apparatus 150 with the configuration of FIG. 16, when learning of the coefficient stored in the B coefficient memory 157-3 is performed, for example, a B component image, which is obtained by disposing an image sensor corresponding to a B component in the frame 14 of FIG. 5, is used as a teacher image, and learning for generating a B output image is performed.

The B prediction tap selection unit 153-3 selects and acquires a B prediction tap which is a prediction tap necessary in generating the B component image from the G output image. The B prediction tap is formed by, for example, a predetermined number of pixels centering on a central pixel, and the central pixel is a pixel of the G output image at a position corresponding to a target pixel of an output image. In addition, in a case of FIG. 16, unlike in the case of FIG. 6, the B prediction tap is selected by the B prediction tap selection unit 153-3 from the G output image. Therefore, in this case, the B prediction tap is formed by only the G component pixel.

The B prediction tap selected by the B prediction tap selection unit 153-3 is supplied to the B conversion unit 155-32. The B conversion unit 155-32 performs a B conversion process on each pixel value forming the B prediction tap.

The B conversion process here is performed as follows, for example.

In a case of FIG. 16, unlike in the case of FIG. 6, the B prediction tap is selected from the G output image by the B prediction tap selection unit 153-3. Therefore, in this case, the B prediction tap is formed by only the G component pixels. Here, a G component pixel of the G output image is indicated by a prediction value Gp.

$$Gp' = Gp - (Dg - Db) \quad (19)$$

It is possible to increase the correlation of each pixel value forming the B prediction tap by performing the B conversion process. In other words, a pixel value of the G output image is offset with respect to a pixel value of the B pixel of the input image, serving as a reference, and thus it is possible to remove a variation due to a color component difference of each pixel value forming the B prediction tap.

The B prediction tap output from the B conversion unit 155-32 is supplied to the B product-sum operation unit 158-3. In addition, the B prediction tap output from the B conversion unit 155-32 includes the conversion value Gp' which has been operated using the above Equation (19).

The B product-sum operation unit 158-3 has the same configuration as the B product-sum operation unit 108-3 of FIG. 6, and predictively operates a pixel value of a target pixel in a B output image on the basis of the B prediction tap.

In this way, each target pixel is predicted, and thus the B output image can be obtained. However, the B output image obtained here is operated by assigning the B prediction tap including only the G component to the preset linear first order equation and by using the coefficient correlated with the class code generated from the B class tap which is formed by the respective R, G and B components.

The B output image obtained in this way uses only the G component pixel in the B prediction tap and is thus hardly influenced by an influence of local variations in the R component and B component pixel values. In addition, since the pixels of the respective components of R, G and B are used in the B class tap, the R component and B component pixels can be correlated with class codes. Therefore, a resolution of the B output image is not reduced even if the B prediction tap is formed by only the G component pixel. Examples of structure of class tap or prediction tap Structure of G class tap FIGS. 17A to 17D are diagrams illustrating examples of a structure of the G class tap acquired in the image processing apparatus 150 of FIG. 16.

The examples of FIGS. 17A to 17D illustrate the G class tap formed by nine (=3×3) pixels centering on a pixel (central pixel) of an input image corresponding to a target pixel of a G output image. In addition, here, an example of a structure of the G class tap is illustrated in a case where, in pixels with the Bayer array which is configured in the unit of four pixels (one R component pixel, one B component pixel, and two G component pixels), each of the four pixels in the unit is set as a central pixel.

Figures 17A, 17B, 17C, 17D:
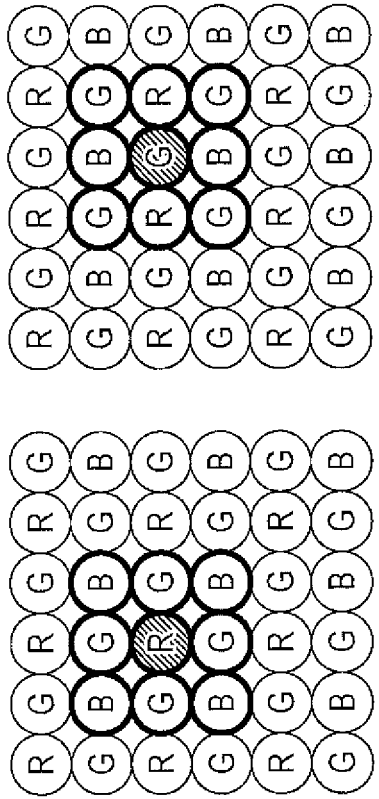
FIGS. 17A to 17D are diagrams illustrating examples of a structure of a G class tap acquired in the image processing apparatus of FIG. 16.

FIG. 17A is a diagram illustrating an example of the G class tap in a case where the R component pixel of the pixels with the Bayer array is used as a central pixel.

FIG. 17B is a diagram illustrating an example of the G class tap in a case where the G component pixel of the pixels with the Bayer array is used as a central pixel.

FIG. 17C is a diagram illustrating an example of the G class tap in a case where another G component pixel of the pixels with the Bayer array is used as a central pixel.

FIG. 17D is a diagram illustrating an example of the G class tap in a case where the B component pixel of the pixels with the Bayer array is used as a central pixel.

Structure of G Prediction Tap

FIGS. 18A to 18D are diagrams illustrating an example of a structure of the G prediction tap acquired in the image processing apparatus 150 of FIG. 16.

The examples of FIGS. 18A to 18D illustrate the G prediction tap formed by only g pixels among nine (=3×3) pixels centering on a pixel (central pixel) of an input image corresponding to a target pixel of a G output image. In addition, here, an example of a structure of the G prediction tap is illustrated in a case where, in pixels with the Bayer array which is configured in the unit of four pixels (one R component pixel, one B component pixel, and two G component pixels), each of the four pixels in the unit is set as a central pixel.

FIG. 18A is a diagram illustrating an example of the G prediction tap in a case where the R component pixel of the pixels with the Bayer array is used as a central pixel.

FIG. 18B is a diagram illustrating an example of the G prediction tap in a case where the G component pixel of the pixels with the Bayer array is used as a central pixel.

FIG. 18C is a diagram illustrating an example of the G prediction tap in a case where another G component pixel of the pixels with the Bayer array is used as a central pixel.

FIG. 18D is a diagram illustrating an example of the G prediction tap in a case where the B component pixel of the pixels with the Bayer array is used as a central pixel.

In addition, as long as the G class tap is formed by respective R, G and B component pixels, and the G prediction tap is formed by only the G component pixel, the G class tap and the G prediction tap may or may not have the same structure.

Structure of R Class Tap

FIGS. 19A to 19D are diagrams illustrating examples of a structure of the R class tap acquired in the image processing apparatus 150 of FIG. 16.

The examples of FIGS. 19A to 19D illustrate the R class tap formed by cross-shaped five pixels centering on a pixel (central pixel) of an input image corresponding to a target pixel of an R output image. In addition, here, an example of a structure of the R class tap is illustrated in a case where, in pixels with the Bayer array which is configured in the unit of four pixels (one R component pixel, one B component pixel, and two G component pixels), each of the four pixels in the unit is set as a central pixel.

FIG. 19A is a diagram illustrating an example of the R class tap in a case where the R component pixel of the pixels with the Bayer array is used as a central pixel.

FIG. 19B is a diagram illustrating an example of the R class tap in a case where the G component pixel of the pixels with the Bayer array is used as a central pixel.

FIG. 19C is a diagram illustrating an example of the R class tap in a case where another G component pixel of the pixels with the Bayer array is used as a central pixel.

FIG. 19D is a diagram illustrating an example of the R class tap in a case where the B component pixel of the pixels with the Bayer array is used as a central pixel.

Structure of R Prediction Tap

FIGS. 20A to 20D are diagrams illustrating an example of a structure of the R prediction tap acquired in the image processing apparatus 150 of FIG. 16. As illustrated in FIGS. 20A to 20D, the R prediction tap is acquired from the G output image, and thus all the circles in the FIGS. 20A to 20D have Gp therein.

The examples of FIGS. 20A to 20D illustrate the R prediction tap formed by cross-shaped five pixels centering on a pixel (central pixel) of an input image corresponding to a target pixel of an R output image. In addition, here, an example of a structure of the R prediction tap is illustrated in a case where, in pixels with the Bayer array which is configured in the unit of four pixels (one R component pixel, one B component pixel, and two G component pixels), each of the four pixels in the unit is set as a central pixel.

FIG. 20A is a diagram illustrating an example of the R prediction tap in a case where the R component pixel of the pixels with the Bayer array is used as a central pixel.

FIG. 20B is a diagram illustrating an example of the R prediction tap in a case where the G component pixel of the pixels with the Bayer array is used as a central pixel.

FIG. 20C is a diagram illustrating an example of the R prediction tap in a case where another G component pixel of the pixels with the Bayer array is used as a central pixel.

FIG. 20D is a diagram illustrating an example of the R prediction tap in a case where the B component pixel of the pixels with the Bayer array is used as a central pixel.

In addition, the R class tap and the R prediction tap may or may not have the same structure.

Structure of B Class Tap

FIGS. 21A to 21D are diagrams illustrating examples of a structure of the B class tap acquired in the image processing apparatus 150 of FIG. 16.

The examples of FIGS. 21A to 21D illustrate the B class tap formed by cross-shaped five pixels centering on a pixel (central pixel) of an input image corresponding to a target pixel of a B output image. In addition, here, an example of a structure of the B class tap is illustrated in a case where, in pixels with the Bayer array which is configured in the unit of four pixels (one R component pixel, one B component pixel, and two G component pixels), each of the four pixels in the unit is set as a central pixel.

Figures 21A, 21B, 21C, 21D:
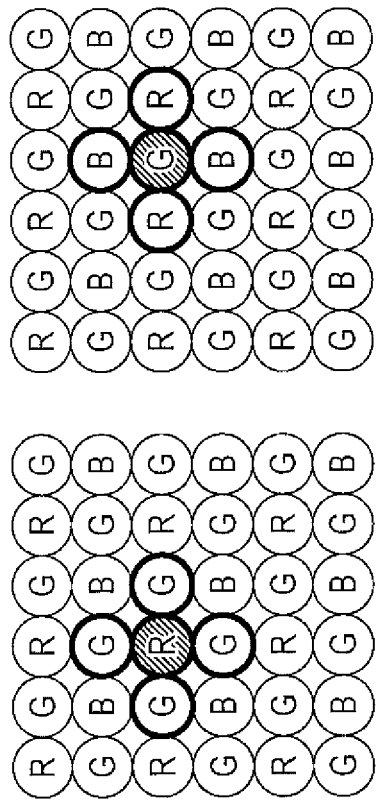
FIGS. 21A to 21D are diagrams illustrating examples of a structure of a B class tap acquired in the image processing apparatus of FIG. 16.

FIG. 21A is a diagram illustrating an example of the B class tap in a case where the R component pixel of the pixels with the Bayer array is used as a central pixel.

FIG. 21B is a diagram illustrating an example of the B class tap in a case where the G component pixel of the pixels with the Bayer array is used as a central pixel.

FIG. 21C is a diagram illustrating an example of the B class tap in a case where another G component pixel of the pixels with the Bayer array is used as a central pixel.

FIG. 21D is a diagram illustrating an example of the B class tap in a case where the B component pixel of the pixels with the Bayer array is used as a central pixel.

Structure of B Prediction Tap

FIGS. 22A to 22D are diagrams illustrating an example of a structure of the B prediction tap acquired in the image processing apparatus 150 of FIG. 16. As illustrated in FIGS. 22A to 22D, the B prediction tap is acquired from the G output image, and thus all the circles in the FIGS. 22A to 22D have Gp therein.

The examples of FIGS. 22A to 22D illustrate the B prediction tap formed by cross-shaped five pixels centering on a pixel (central pixel) of an input image corresponding to a target pixel of a B output image. In addition, here, an example of a structure of the B prediction tap is illustrated in a case where, in pixels with the Bayer array which is configured in the unit of four pixels (one R component pixel, one B component pixel, and two G component pixels), each of the four pixels in the unit is set as a central pixel.

FIG. 22A is a diagram illustrating an example of the B prediction tap in a case where the R component pixel of the pixels with the Bayer array is used as a central pixel.

FIG. 22B is a diagram illustrating an example of the B prediction tap in a case where the G component pixel of the pixels with the Bayer array is used as a central pixel.

FIG. 22C is a diagram illustrating an example of the B prediction tap in a case where another G component pixel of the pixels with the Bayer array is used as a central pixel.

FIG. 22D is a diagram illustrating an example of the B prediction tap in a case where the B component pixel of the pixels with the Bayer array is used as a central pixel.

In addition, the B class tap and the B prediction tap may or may not have the same structure. Further, in the class taps, the G class tap, the R class tap, and the B class tap may or may not have the same structure. Similarly, in the prediction taps, the G prediction tap, the R prediction tap, and the B prediction tap may or may not have the same structure.

As described above, the image processing apparatus is configured as illustrated in FIG. 16, and thus it is possible to perform an image process with higher quality in terms of an amount of noise or a resolution (frequency characteristic) than, for example, in the case of the configuration of FIG. 6. In addition, since only a G component pixel is used in each prediction tap, and thus an output image is hardly influenced by local variations in R component and B component pixel values, it is possible to reduce the zipper noise in the output image. In this case, since pixels of the respective R, G and B components are used in each class tap, the R component and B component pixels can be correlated with class codes. Therefore, a resolution of the output image is not reduced even if each prediction tap is formed by only the G component pixel.

Another Configuration of Image Processing Apparatus

Although a description has been made that, in the image processing apparatus 150 of FIG. 16, the R class tap selection unit 152-2 selects the R class tap from the input image, the R class tap may be selected from the G output image as illustrated in FIG. 23. In this case, the R class tap is formed by only the G component pixel. Therefore, in an R conversion process performed by the R conversion unit 155-21, when the G component pixel of the G output image is indicated by a prediction value Gp, a conversion value Gp' is operated using the above Equation (18).

In addition, although a description has been made that, in the image processing apparatus 150 of FIG. 16, the B class tap selection unit 152-3 selects the B class tap from the input image, the B class tap may be selected from the G output image as illustrated in FIG. 23. In this case, the B class tap is formed by only the G component pixel. Therefore, in a B conversion process performed by the B conversion unit 155-31, when the G component pixel of the G output image is indicated by a prediction value Gp, a conversion value Gp' is operated using the above Equation (19).

3. Third Embodiment

The zipper noise is a phenomenon occurring when a color difference variation between pixels in a tap is notable. Therefore, a detection result of a color component variation in an input image is made to be included in a class code generated by each class sorting unit, and thus it is possible to further improve accuracy of reducing the zipper noise.

Configuration of Image Processing Apparatus

Figure 24:
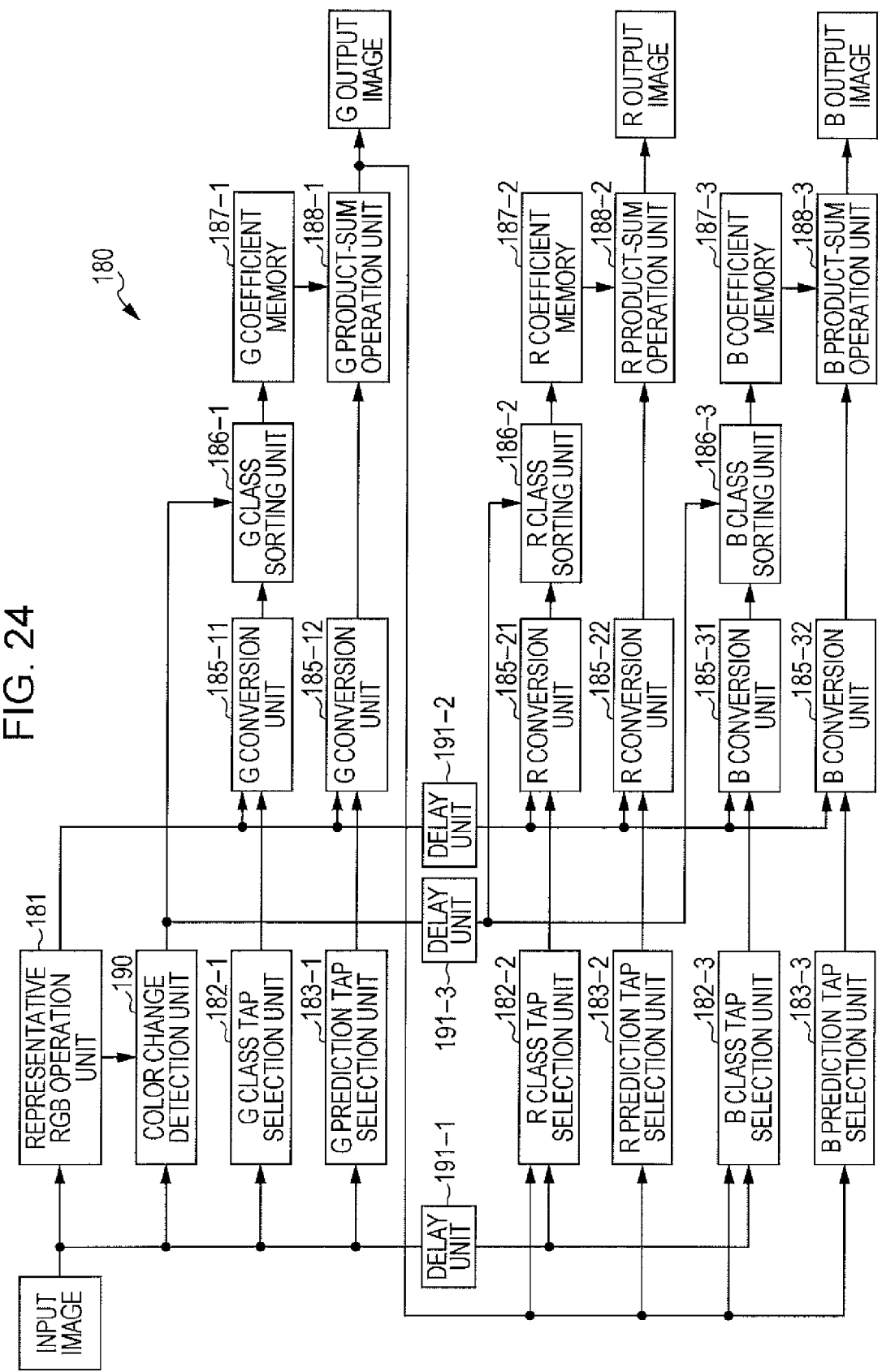
FIG. 24 is a block diagram illustrating a configuration example according to another embodiment of an image processing apparatus to which the present technology is applied.

FIG. 24 is a block diagram illustrating a configuration example according to another embodiment of an image processing apparatus to which the present technology is applied. An image processing apparatus 180 illustrated in FIG. 24 first generates a G output image, and then generates an R output image and a B output image by using the generated G output image. In addition, in the image processing apparatus 180 illustrated in FIG. 24, each prediction tap includes only a G component pixel as a countermeasure for reducing the zipper noise which occurs in an output image. In addition, in a case of FIG. 24, unlike in the case of FIG. 16, a color variation detection unit 190 is provided, and a detection result of a color component variation performed by the color variation detection unit 190 is included in a class code as a countermeasure for reducing the zipper noise which occurs in an output image.

A representative RGB operation unit 181 of FIG. 24 has the same configuration as the representative RGB operation unit 151 of FIG. 16, and thus detailed description thereof will not be repeated, but, among a representative value Dr, a representative value Db, and a representative value Dg operated by the representative RGB operation unit 181, the G component representative value Dg is also supplied to the color variation detection unit 190.

The color variation detection unit 190 calculates a color variation amount of the R component and a color variation amount of the B component from the input image. Here, when the color variation amount of the R component is indicated by $\Delta R$, the color variation detection unit 190 performs an operation of Equation (20) so as to calculate $\Delta R$.

$$\Delta R = DR(R-g)/Dg \tag{20}$$

Here, in Equation (20), DR indicates a dynamic range. In addition, R indicates an input value of a pixel R, g indicates an interpolation value, and Dg indicates a representative value. Accordingly, a variation amount of the R component for the G component is obtained.

The color variation detection unit 190 determines whether or not a value of $\Delta R$ exceeds a predetermined threshold value. The color variation detection unit 190 determines that a color variation amount of the R component is large, for example, if a value of $\Delta R$ is equal to or greater than the predetermined threshold value, and determines that the color variation amount of the R component is small if the value of the $\Delta R$ is smaller than the predetermined threshold value.

In addition, when the color variation amount of the B component is indicated by $\Delta B$, the color variation detection unit 190 performs an operation of Equation (21) so as to calculate $\Delta B$.

$$\Delta B = DR(B-g)/Dg \tag{21}$$

Here, in Equation (21), DR indicates a dynamic range. In addition, B indicates an input value of a pixel B, g indicates an interpolation value, and Dg indicates a representative value. Accordingly, a variation amount of the B component for the G component is obtained.

The color variation detection unit 190 determines whether or not a value of $\Delta B$ exceeds a predetermined threshold value. The color variation detection unit 190 determines that a color variation amount of the B component is large, for example, if a value of $\Delta B$ is equal to or greater than the predetermined threshold value, and determines that the color variation amount of the R component is small if the value of the $\Delta B$ is smaller than the predetermined threshold value.

The color variation detection result obtained in this way is supplied to the R class sorting unit 186-2 and the B class sorting unit 186-3 via the G class sorting unit 186-1 and the delay unit 191-3. In other words, in this case, the color variation detection result includes information indicating a magnitude of the color variation amount of the R component and a magnitude of the color variation amount of the B component.

In FIG. 24, a functional block related to generation of the G output image, that is, the G class tap selection unit 182-1, the G conversion unit 185-11, the G class sorting unit 186-1, the G coefficient memory 187-1, the G prediction tap selection unit 183-1, the G conversion unit 185-12, and the G product-sum operation unit 188-1 respectively fundamentally have the same configurations as the G class tap selection unit 152-1, the G conversion unit 155-11, the class sorting unit 156-1, the G coefficient memory 157-1, the G prediction tap selection unit 153-1, the G conversion unit 155-12, and the G product-sum operation unit 158-1 of FIG. 16, and thus detailed description thereof will not be repeated.

However, the G class sorting unit 186-1 codes the G class tap by using adaptive dynamic range coding (ADRC) so as to generate a class code, and the class code includes a color variation detection result by the color variation detection unit 190. In addition, the G coefficient memory 187-1 stores a coefficient which is obtained in advance through learning and is used in a product-sum operation performed by the G product-sum operation unit 188-1, in correlation with the class code.

In addition, in a case of using the image processing apparatus 180 with the configuration of FIG. 24, when learning of the coefficient stored in the G coefficient memory 187-1 is performed, for example, a G component image, which is obtained by disposing an image sensor corresponding to a G component in the frame 14 of FIG. 5, is used as a teacher image, and learning for generating a G output image is performed.

The G output image obtained in this way is generated through a product-sum operation using coefficients based on the magnitudes of the color variation amount of the R component and the color variation amount of the B component, and thus it is possible to further improve accuracy of reducing the zipper noise.

In addition, in FIG. 24, a functional block related to generation of the R output image, that is, the R class tap selection unit 182-2, the R conversion unit 185-21, the R class sorting unit 186-2, the R coefficient memory 187-2, the R prediction tap selection unit 183-2, the R conversion unit 185-22, and the R product-sum operation unit 188-2 respectively fundamentally have the same configurations as the R class tap selection unit 152-2, the R conversion unit 155-21, the R class sorting unit 156-2, the R coefficient memory 157-2, the R prediction tap selection unit 153-2, the R conversion unit 155-22, and the R product-sum operation unit 158-2 of FIG. 16, and thus detailed description thereof will not be repeated.

However, the R class sorting unit 186-2 codes the R class tap by using adaptive dynamic range coding (ADRC) so as to generate a class code, and the class code includes a color variation detection result by the color variation detection unit 190. In addition, the R coefficient memory 187-2 stores a coefficient which is obtained in advance through learning and is used in a product-sum operation performed by the R product-sum operation unit 188-2, in correlation with the class code.

In addition, in a case of using the image processing apparatus 180 with the configuration of FIG. 24, when learning of the coefficient stored in the R coefficient memory 187-2 is performed, for example, a R component image, which is obtained by disposing an image sensor corresponding to a R component in the frame 14 of FIG. 5, is used as a teacher image, and learning for generating a R output image is performed.

The R output image obtained in this way is generated through a product-sum operation using coefficients based on the magnitudes of the color variation amount of the R component and the color variation amount of the B component, and thus it is possible to further improve accuracy of reducing the zipper noise.

In FIG. 24, a functional block related to generation of the B output image, that is, the B class tap selection unit 182-3, the B conversion unit 185-31, the B class sorting unit 186-3, the B coefficient memory 187-3, the B prediction tap selection unit 183-3, the B conversion unit 185-32, and the B product-sum operation unit 188-3 respectively fundamentally have the same configurations as the B class tap selection unit 152-3, the B conversion unit 155-31, the B class sorting unit 156-3, the B coefficient memory 157-3, the B prediction tap selection unit 153-3, the B conversion unit 155-32, and the B product-sum operation unit 158-3 of FIG. 16, and thus detailed description thereof will not be repeated.

However, the B class sorting unit 186-3 codes the B class tap by using adaptive dynamic range coding (ADRC) so as to generate a class code, and the class code includes a color variation detection result by the color variation detection unit 190. In addition, the B coefficient memory 187-3 stores a coefficient which is obtained in advance through learning and is used in a product-sum operation performed by the B product-sum operation unit 188-3, in correlation with the class code.

In addition, in a case of using the image processing apparatus 180 with the configuration of FIG. 24, when learning of the coefficient stored in the B coefficient memory 187-3 is performed, for example, a B component image, which is obtained by disposing an image sensor corresponding to a B component in the frame 14 of FIG. 5, is used as a teacher image, and learning for generating a B output image is performed.

The B output image obtained in this way is generated through a product-sum operation using coefficients based on the magnitudes of the color variation amount of the R component and the color variation amount of the B component, and thus it is possible to further improve accuracy of reducing the zipper noise.

In addition, in the above description, the color variation amount $\Delta R$ of the R component has been described as being calculated through the operation of Equation (20), but may be obtained using other operation equations which allow the color variation amount of the R component to be calculated. Further, the color variation amount $\Delta B$ of the B component has been described as being calculated through the operation of Equation (21), but may be obtained using other operation equations which allow the color variation amount of the B component to be calculated.

In the above description, the description has been made that all of the G class sorting unit 186-1, the R class sorting unit 186-2, and the B class sorting unit 186-3 generate the class codes including a code indicating a color variation detection result, but the code indicating a color variation detection result does not necessarily have to be included in the class code in each class sorting unit. For example, only in the G class sorting unit 186-1, the code indicating a color variation detection result may be included in the class code.

In addition, in the above description, the description has been made that both of the information indicating the magnitude of a color variation amount of the R component and the information indicating the magnitude of a color variation amount of the B component are in the color variation detection result, but at least one of the information pieces may be included. Further, information indicating a magnitude of a color variation amount of the G component, obtained using a predetermined operation equation, may be included in the color variation detection result. For example, as a result of detecting a color variation, the R class sorting unit 186-2 may generate a class code including a code which indicates only information indicating a magnitude of a color variation amount of the R component, so as to obtain an R output image. In addition, the B class sorting unit 186-3 may generate a class code including a code which indicates only information indicating a magnitude of a color variation amount of the B component, so as to obtain a B output image.

Image Process Performed by Image Processing Apparatus

Figure 25:
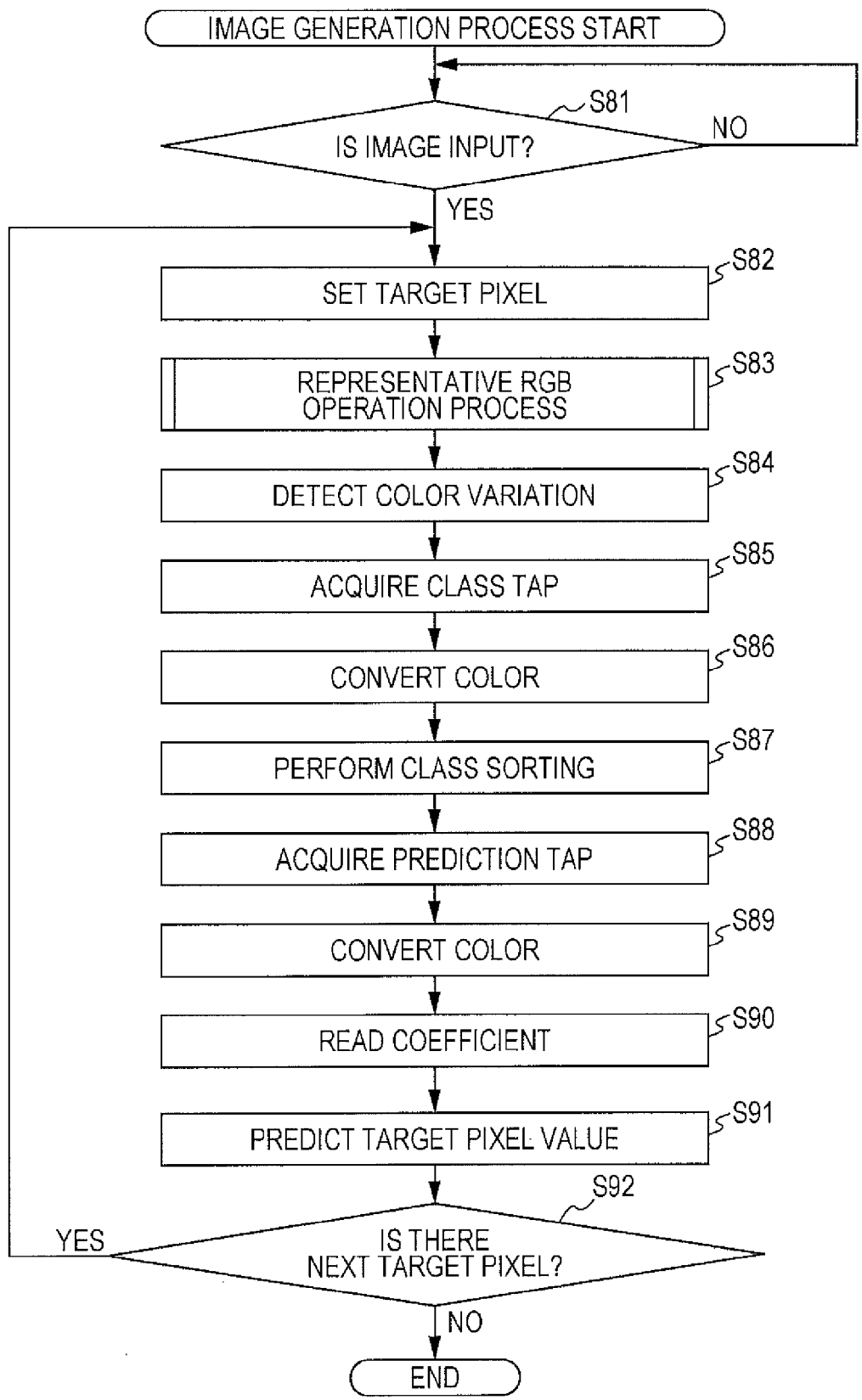
FIG. 25 is a flowchart illustrating an example of an image process performed by the image processing apparatus of FIG. 24.

FIG. 25 is a flowchart illustrating an example of an image process performed by the image processing apparatus 180 of FIG. 24.

In step S81, it is determined whether or not an image (input image) which is a target of the image process is input, and waiting is performed until it is determined that the image is input. If it is determined that the image is input in step S81, the process proceeds to step S82.

In step S82, a target pixel is set. Accordingly, a central pixel in the input image is determined.

In step S83, the representative RGB operation unit 181 performs a representative RGB operation process described with reference to FIG. 14. Accordingly, the above-described representative value Dg, representative value Dr, and representative value Db are operated.

In step S84, the color variation detection unit 190 detects a color component variation from the input image. For example, as a result of detecting the color variation, information indicating a magnitude of a color variation amount of the R component and information indicating a magnitude of a color variation amount of the B component are obtained.

In step S85, the G class tap selection unit 182-1, the R class tap selection unit 182-2, or the B class tap selection unit 182-3 respectively acquires a G class tap, an R class tap, or a B class tap.

In a case where a G output image is generated, the G class tap is acquired. In a case where an R output image is generated, the R class tap is acquired. In a case where a output image is generated, the B class tap is acquired. Hereinafter, for simplification of description, the case of generating the G output image will be described. However, as described above, the G class tap is formed by the respective R, G and B components.

In step S86, color conversion is performed. For example, in a case of generating the G output image, the G conversion unit 185-11 performs the G conversion. At this time, the conversion value G', the conversion value R', and the conversion value B' are operated using the above Equations (1) to (3).

In step S87, class sorting is performed. For example, in a case of generating the G output image, the G class sorting unit 186-1 codes the supplied G class tap by using adaptive dynamic range coding (ADRC), so as to generate a class code, thereby performing the class sorting. The class code generated here includes a code indicating the color variation detection result.

In step S88, a prediction tap is acquired. For example, in a case of generating the G output image, the G prediction tap selection unit 183-1 acquires a G prediction tap. However, as described above, the G prediction tap is formed by only the G pixel.

In step S89, color conversion is performed. For example, in a case of generating the G output image, the G conversion unit 185-12 performs the G conversion. At this time, since the G prediction tap is formed by only the G component pixel, the conversion value G' is operated using the above Equation (1).

In step S90, a coefficient is read. For example, in a case of generating the G output image, a coefficient, which is stored in correlation with the class code generated due to the process in step S87, is read from the G coefficient memory 187-1.

In step S91, a target pixel value is predicted. For example, in a case of generating the G output image, the G prediction tap having undergone the color conversion due to the process in step S89 is assigned to the pixels $x_1, x_2, \ldots,$ and $x_N$ of Equation (4), the coefficient read due to the process in step S90 is supplied as the tap coefficient $w_n$ of Equation (4), and then the operation of Equation (4) is performed by the G product-sum operation unit 188-1, thereby predicting a pixel value of the target pixel of the output image.

In step S92, it is determined whether or not there is the next target pixel, and if it is determined that there is the next target pixel, the process returns to step S82, and the subsequent processes are repeatedly performed.

If it is determined that there is no next target pixel in step S92, the process ends.

In this way, the image generation process is performed.

Other Examples of Arrangement of Color Filter Array

Figure 26:
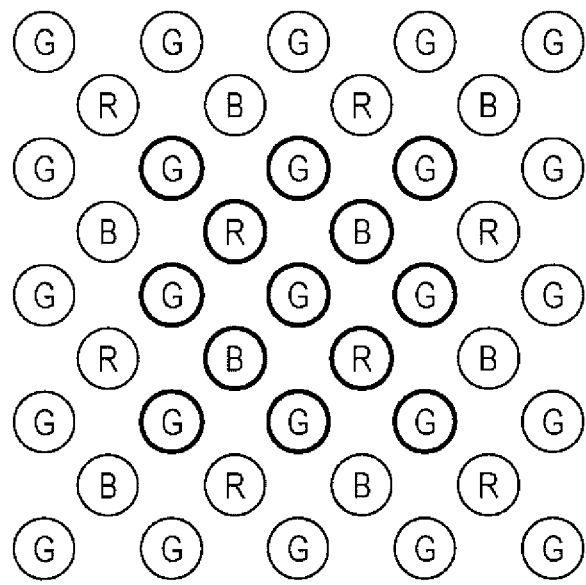
FIG. 26 is a diagram illustrating an example of another structure of a class tap acquired in the image processing apparatus of FIG. 16 or FIG. 24.
Figure 27:
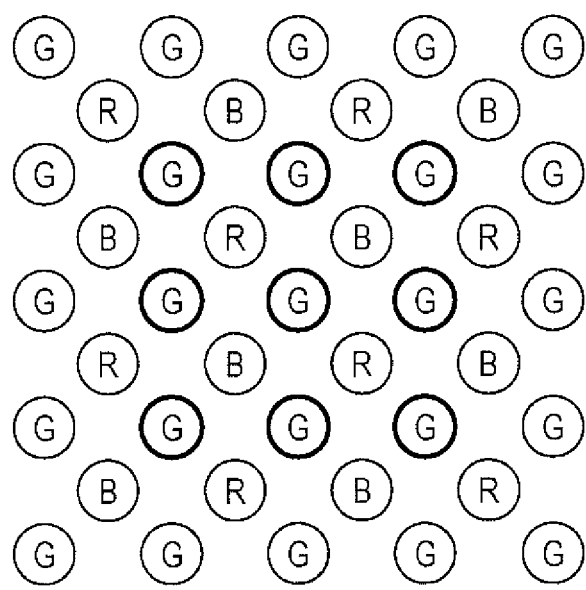
FIG. 27 is a diagram illustrating an example of another structure of a prediction tap acquired in the image processing apparatus of FIG. 16 or FIG. 24.

In the above description, the description has been made of an example in which the color filter array with the Bayer array is used as a color filter array, but a color filter array with arrangements other than the Bayer array may be used. For example, a pixel arrangement (hereinafter, referred to as an oblique Bayer array) may be used in which a position where a pixel is disposed is shifted by a ½ pixel for each horizontal line of the Bayer array. FIGS. 26 and 27 illustrate examples of structures of a class tap and a prediction tap when the oblique Bayer array is used.

Structure of Class Tap

FIG. 26 is a diagram illustrating a structure of a class tap acquired in the image processing apparatus 150 of FIG. 16 or the image processing apparatus 180 of FIG. 24. Here, the class tap is the general term for the above-described G class tap, R class tap, and B class tap.

The example of FIG. 26 illustrates the class tap formed by thirteen pixels which are disposed in the oblique Bayer array. In the image processing apparatus 150 of FIG. 16 or the image processing apparatus 180 of FIG. 24, each class tap is formed by pixels of the respective R, G and B components.

Structure of Prediction Tap

FIG. 27 is a diagram illustrating a structure of a prediction tap acquired in the image processing apparatus 150 of FIG. 16 or the image processing apparatus 180 of FIG. 24. Here, the prediction tap is the general term for the above-described G prediction tap, R prediction tap, and B prediction tap.

The example of FIG. 27 illustrates the prediction tap formed by only the nine G component pixels among the thirteen pixels corresponding to the class tap of FIG. 26. In the image processing apparatus 150 of FIG. 16 or the image processing apparatus 180 of FIG. 24, each prediction tap is formed by only the G component pixel.

In addition, also in a case of using the oblique Bayer array, in the same manner as in the above-described Bayer array, the class tap and the prediction tap may or may not have the same structure. Further, in the class taps, the G class tap, the R class tap, and the B class tap may or may not have the same structure. Similarly, in the prediction taps, the G prediction tap, the R prediction tap, and the B prediction tap may or may not have the same structure.

Configuration of Computer

The above-described series of processes may be performed by hardware or software. When the above-described series of processes is performed by the software, programs constituting the software are installed from a network or a recording medium to a computer incorporated into dedicated hardware, or, for example, a general purpose personal computer 900 or the like as illustrated in FIG. 28 which can execute various kinds of functions by installing various kinds of programs.

In FIG. 28, a CPU (Central Processing Unit) 901 performs various processes according to a program stored in a read only memory (ROM) 902 or a program which is loaded to a random access memory (RAM) 903 from a storage unit 908. The RAM 903 appropriately stores data or the like which is necessary for the CPU 901 to execute various processes.

The CPU 901, the ROM 902, and the RAM 903 are connected to each other via a bus 904. In addition, an input and output interface 905 is also connected to the bus 904.

The input and output interface 905 is connected to an input unit 906 including a keyboard, a mouse, and the like, an output unit 907 including a display such as a liquid crystal display (LCD), a speaker, and the like, a storage unit 908 including a hard disk, or the like, and a communication unit 909 including a modem, a network interface card such as a LAN card, or the like. The communication unit 909 performs a communication process via a network including the Internet.

A drive 910 is connected to the input and output interface 905 as necessary, a removable medium 911 such as a magnetic disk, an optical disc, a magneto-optical disc, or a semiconductor memory, is appropriately installed therein, and a computer program read therefrom is installed in the storage unit 908 as necessary.

In a case where the above-described series of processes is executed in software, a program constituting the software is installed from a network such as the Internet or a recording medium including the removable medium 911 or the like.

The recording medium includes, for example, as illustrated in FIG. 28, not only the removable medium 911 such as a magnetic disk (including a floppy disk (registered trademark)), an optical disc (including a compact disc-read only memory (CD-ROM) and a digital versatile disc (DVD)), a magneto-optical disc (including a mini disc (MD)), or a semiconductor memory, which is distributed so as to deliver a program to a user separately from a device body, but also the ROM 902 which is sent to a user in a state of being preliminarily incorporated into a device body and records a program therein, or a hard disk included in the storage unit 908.

In the present specification, the above-described series of processes includes not only processes performed in a time series according to the described order, but also processes performed in parallel or separately even if not necessarily performed in the time series.

In addition, embodiments of the present technology are not limited to the above-described embodiments but may have various modifications within the scope without departing from the spirit of the present technology.

In addition, the present technology may have the following configurations.

(1) An image processing apparatus including a class tap selection unit that selects pixel values related to pixels corresponding to a plurality of color components as a class tap, from a first image formed by image signals which are output from a single-plate type pixel portion where the pixels respectively corresponding to the plurality of color components are regularly disposed on a plane; a class sorting unit that sorts out target pixels of second images as any one of a plurality of classes on the basis of a feature amount obtained from the pixel values of the plurality of color components of the class tap, each of the second images being formed by pixels of only a single color component of the plurality of color components; a coefficient reading unit that reads a coefficient stored in advance on the basis of a result of the class sorting; a prediction tap selection unit that selects pixel values related to pixels corresponding to a first color component of the plurality of color components as a prediction tap from the first image; and a product-sum operation unit that uses the pixel values of the first color component of the prediction tap as variables, and operates pixel values of the second images through a product-sum operation using the read coefficient, wherein the second image formed by only the first color component is generated from an image formed by the plurality of color components, and wherein, when the second image formed by only a second color component different from the first color component is generated from the image formed by the plurality of color components, the prediction tap is acquired from the second image formed by only the first color component.

(2) The image processing apparatus according to (1), further including a representative value operation unit that selects a designated region including a predetermined number of pixels from the first image, and operates representative values for the respective color components in the designated region; and a first color component conversion unit that converts the pixel values of the first color component of the prediction tap into first conversion values which are obtained by offsetting the pixel values of the first color component with respect to a pixel value of one of the plurality of color components serving as a reference by using the representative value, wherein the product-sum operation unit uses the first conversion values as variables, and operates pixel values of the second image through a product-sum operation using the read coefficient.

(3) The image processing apparatus according to (2), further including a second color component conversion unit that converts the pixel values of the plurality of color components of the class tap into second conversion values which are obtained by offsetting the pixel values of the plurality of color components with respect to a pixel value of one of the plurality of color components serving as a reference by using the representative value, wherein the class sorting unit determines a feature amount of the class tap on the basis of the second conversion values.

(4) The image processing apparatus according to (2) or (3), wherein the single-plate type pixel portion is a pixel portion with a Bayer array including R, G and B components, and wherein the representative value operation unit calculates an interpolation value g of an R pixel or a B pixel on the basis of a G pixel around the R pixel or the B pixel; calculates an interpolation value r and an interpolation value b of the G pixel on the basis of the R pixel or the B pixel around the G pixel; operates a G representative value by using an average value of an input value G which is directly obtained from the G pixel and the interpolation value g; operates an R representative value on the basis of a difference between the interpolation value r and the input value G, a difference between an input value R which is directly obtained from the R pixel and the interpolation value g, and the G representative value; and operates a B representative value on the basis of a difference between the interpolation value b and the input value G, a difference between an input value B which is directly obtained from the B pixel and the interpolation value g, and the G representative value.

(5) The image processing apparatus according to (4), wherein, when the second image is formed by only the G pixel, the color component conversion unit offsets the input value R by a difference between the R representative value and the G representative value, and offsets the input value B by a difference between the B representative value and the G representative value, wherein, when the second image is formed by only the R pixel, the color component conversion unit offsets the input value G by a difference between the G representative value and the R representative value, and offsets the input value B by a difference between the B representative value and the R representative value, and wherein, when the second image is formed by only the B pixel, the color component conversion unit offsets the input value G by a difference between the G representative value and the B representative value, and offsets the input value R by a difference between the R representative value and the B representative value.

(6) The image processing apparatus according to any one of (1) to (5), further including a color variation detection unit that detects a color component variation from the first image, wherein the class sorting unit performs class sorting on the basis of a detection result by the color variation detection unit.

(7) The image processing apparatus according to any one of (1) to (6), wherein the coefficient read by the coefficient reading unit is obtained in advance through learning, and wherein, in the learning, images, which are formed by image signals output from a plurality of pixel portions each of which includes pixels of only a single color component of the plurality of color components, are used as teacher images, the pixel portions being disposed at a position closer to a subject than an optical low-pass filter disposed between the single-plate type pixel portion and the subject; an image formed by the image signals output from the single-plate type pixel portion is used as a student image; and the coefficient is calculated by solving a normal equation which maps the pixel of the student image and the pixel of the teacher image to each other.

(8) An image processing method of an image processing apparatus, the method including causing the image processing apparatus to select pixel values related to pixels corresponding to a plurality of color components as a class tap, from a first image formed by image signals which are output from a single-plate type pixel portion where the pixels respectively corresponding to the plurality of color components are regularly disposed on a plane; sort out target pixels of second images as any one of a plurality of classes on the basis of a feature amount obtained from the pixel values of the plurality of color components of the class tap, each of the second images being formed by pixels of only a single color component of the plurality of color components; read a coefficient stored in advance on the basis of a result of the class sorting; select pixel values related to pixels corresponding to a first color component of the plurality of color components as a prediction tap from the first image; use the pixel values of the first color component of the prediction tap as variables, and operate pixel values of the second image through a product-sum operation using the read coefficient; generate the second image formed by only the first color component from an image formed by the plurality of color components; and acquire the prediction tap from the second image formed by only the first color component when the second image formed by only a second color component different from the first color component is generated from the image formed by the plurality of color components.

(9) A program causing a computer to perform an image process of generating a second image from a first image, the program causing the computer to: select pixel values related to pixels corresponding to a plurality of color components as a class tap, from a first image formed by image signals which are output from a single-plate type pixel portion where the pixels respectively corresponding to the plurality of color components are regularly disposed on a plane; sort out target pixels of second images as any one of a plurality of classes on the basis of a feature amount obtained from the pixel values of the plurality of color components of the class tap, each of the second images being formed by pixels of only a single color component of the plurality of color components; read a coefficient stored in advance on the basis of a result of the class sorting; select pixel values related to pixels corresponding to a first color component of the plurality of color components as a prediction tap from the first image; use the pixel values of the first color component of the prediction tap as variables, and operate pixel values of the second image through a product-sum operation using the read coefficient; generate the second image formed by only the first color component from an image formed by the plurality of color components; and acquire the prediction tap from the second image formed by only the first color component when the second image formed by only a second color component different from the first color component is generated from the image formed by the plurality of color components.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    a class tap selection unit that selects pixel values related to pixels corresponding to a plurality of color components as a class tap, from a first image formed by image signals which are output from a single-plate type pixel portion where the pixels respectively corresponding to the plurality of color components are regularly disposed on a plane;
    a class sorting unit that sorts out target pixels of second images as any one of a plurality of classes on the basis of a feature amount obtained from the pixel values of the plurality of color components of the class tap, each of the second images being formed by pixels of only a single color component of the plurality of color components;
    a coefficient reading unit that reads a coefficient stored in advance on the basis of a result of the class sorting;
    a prediction tap selection unit that selects pixel values related to pixels corresponding to a first color component of the plurality of color components as a prediction tap from the first image; and
    a product-sum operation unit that uses the pixel values of the first color component of the prediction tap as variables, and operates pixel values of the second images through a product-sum operation using the read coefficient,
    wherein the second image formed by only the first color component is generated from an image formed by the plurality of color components, and
    wherein, when the second image formed by only a second color component different from the first color component is generated from the image formed by the plurality of color components, the prediction tap is acquired from the second image formed by only the first color component.

2. The image processing apparatus according to claim 1, further comprising:
    a representative value operation unit that selects a designated region including a predetermined number of pixels from the first image, and operates representative values for the respective color components in the designated region; and
    a first color component conversion unit that converts the pixel values of the first color component of the prediction tap into first conversion values which are obtained by offsetting the pixel values of the first color component with respect to a pixel value of one of the plurality of color components, serving as a reference, by using the representative value, wherein the product-sum operation unit uses the first conversion values as variables, and operates pixel values of the second image through the product-sum operation using the read coefficient.

3. The image processing apparatus according to claim 2, further comprising:
a second color component conversion unit that converts the pixel values of the plurality of color components of the class tap into second conversion values which are obtained by offsetting the pixel values of the plurality of color components with respect to a pixel value of one of the plurality of color components serving as a reference by using the representative value,
wherein the class sorting unit determines a feature amount of the class tap on the basis of the second conversion values.

4. The image processing apparatus according to claim 3, wherein the single-plate type pixel portion is a pixel portion with a Bayer array including R, G and B components, and
wherein the representative value operation unit
calculates an interpolation value g of an R pixel or a B pixel on the basis of a G pixel around the R pixel or the B pixel;
calculates an interpolation value r and an interpolation value b of the G pixel on the basis of the R pixel or the B pixel around the G pixel;
operates a G representative value by using an average value of an input value G which is directly obtained from the G pixel and the interpolation value g;
operates an R representative value on the basis of a difference between the interpolation value r and the input value G, a difference between an input value R which is directly obtained from the R pixel and the interpolation value g, and the G representative value; and
operates a B representative value on the basis of a difference between the interpolation value b and the input value G, a difference between an input value B which is directly obtained from the B pixel and the interpolation value g, and the G representative value.

5. The image processing apparatus according to 4,
wherein, when the second image is formed by only the G pixel, the color component conversion unit offsets the input value R by a difference between the R representative value and the G representative value, and offsets the input value B by a difference between the B representative value and the G representative value,
wherein, when the second image is formed by only the R pixel, the color component conversion unit offsets the input value G by a difference between the G representative value and the R representative value, and offsets the input value B by a difference between the B representative value and the R representative value, and
wherein, when the second image is formed by only the B pixel, the color component conversion unit offsets the input value G by a difference between the G representative value and the B representative value, and offsets the input value R by a difference between the R representative value and the B representative value.

6. The image processing apparatus according to claim 1, further comprising:
a color variation detection unit that detects a color component variation from the first image,
wherein the class sorting unit performs class sorting on the basis of a detection result by the color variation detection unit.

7. The image processing apparatus according to claim 1,
wherein the coefficient read by the coefficient reading unit is obtained in advance through learning, and
wherein, in the learning,
images, which are formed by image signals output from a plurality of pixel portions each of which includes pixels of only a single color component of the plurality of color components, are used as teacher images, the pixel portions being disposed at a position closer to a subject than an optical low-pass filter disposed between the single-plate type pixel portion and the subject;
an image formed by the image signals output from the single-plate type pixel portion is used as a student image; and
the coefficient is calculated by solving a normal equation which maps the pixel of the student image and the pixel of the teacher image to each other.

8. An image processing method of an image processing apparatus, the method comprising:
causing the image processing apparatus to
select pixel values related to pixels corresponding to a plurality of color components as a class tap, from a first image formed by image signals which are output from a single-plate type pixel portion where the pixels respectively corresponding to the plurality of color components are regularly disposed on a plane;
sort out target pixels of second images as any one of a plurality of classes on the basis of a feature amount obtained from the pixel values of the plurality of color components of the class tap, each of the second images being formed by pixels of only a single color component of the plurality of color components;
read a coefficient stored in advance on the basis of a result of the class sorting;
select pixel values related to pixels corresponding to a first color component of the plurality of color components as a prediction tap from the first image;
use the pixel values of the first color component of the prediction tap as variables, and operate pixel values of the second image through a product-sum operation using the read coefficient;
generate the second image formed by only the first color component from an image formed by the plurality of color components; and
acquire the prediction tap from the second image formed by only the first color component when the second image formed by only a second color component different from the first color component is generated from the image formed by the plurality of color components.

9. A program embodied on a non-transitory computer readable medium causing a computer to perform an image process of generating a second image from a first image, the program causing the computer to:
select pixel values related to pixels corresponding to a plurality of color components as a class tap, from the first image formed by image signals which are output from a single-plate type pixel portion where the pixels respectively corresponding to the plurality of color components are regularly disposed on a plane;
sort out target pixels of second images as any one of a plurality of classes on the basis of a feature amount obtained from the pixel values of the plurality of color components of the class tap, each of the second images being formed by pixels of only a single color component of the plurality of color components;

read a coefficient stored in advance on the basis of a result of the class sorting;

select pixel values related to pixels corresponding to a first color component of the plurality of color components as a prediction tap from the first image;

use the pixel values of the first color component of the prediction tap as variables, and operate pixel values of the second image through a product-sum operation using the read coefficient;

generate the second image formed by only the first color component from an image formed by the plurality of color components; and acquire the prediction tap from the second image formed by only the first color component when the second image formed by only a second color component different from the first color component is generated from the image formed by the plurality of color components.

* * * * *